(12) United States Patent
Duan et al.

(10) Patent No.: US 12,506,827 B2
(45) Date of Patent: Dec. 23, 2025

(54) DISPLAY MODULE

(71) Applicant: WUHAN CHINA STAR OPTOELECTRONICS SEMICONDUCTOR DISPLAY TECHNOLOGY CO., LTD., Hubei (CN)

(72) Inventors: Yanqiang Duan, Hubei (CN); Yongzhen Jia, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 358 days.

(21) Appl. No.: 18/263,537

(22) PCT Filed: Jun. 9, 2023

(86) PCT No.: PCT/CN2023/099541
§ 371 (c)(1),
(2) Date: Jul. 30, 2023

(87) PCT Pub. No.: WO2024/234429
PCT Pub. Date: Nov. 21, 2024

(65) Prior Publication Data
US 2025/0112982 A1 Apr. 3, 2025

(30) Foreign Application Priority Data
May 12, 2023 (CN) .......................... 202310548163.2

(51) Int. Cl.
*H04M 1/02* (2006.01)
(52) U.S. Cl.
CPC ................. *H04M 1/0269* (2022.02)

(58) Field of Classification Search
CPC .... G06F 1/1652; G06F 1/1656; G06F 1/1637; G06F 1/1616; G06F 1/1601;
(Continued)

(56) References Cited

U.S. PATENT DOCUMENTS

| | | | | |
|---|---|---|---|---|
| 11,951,722 | B2 * | 4/2024 | Hwang | ............. G02F 1/133331 |
| 2019/0318689 | A1 | 10/2019 | Kim | |
| 2019/0319215 | A1 | 10/2019 | Lee et al. | |

(Continued)

FOREIGN PATENT DOCUMENTS

| | | | | |
|---|---|---|---|---|
| CN | 113012579 A | * | 6/2021 | .......... G06F 1/1652 |
| CN | 113470522 A | | 10/2021 | |
| CN | 214541382 U | | 10/2021 | |
| CN | 115116335 A | | 9/2022 | |
| CN | 115731793 A | | 3/2023 | |

(Continued)

OTHER PUBLICATIONS

International Search Report in International application No. PCT/CN2023/099541, mailed on Nov. 28, 2023.
(Continued)

*Primary Examiner* — Golam Sorowar
(74) *Attorney, Agent, or Firm* — PV IP PC; Wei Te Chung

(57) ABSTRACT

Embodiments of the present disclosure disclose a display module. A first border area of a first frame area of the display module includes a first sub-area. The curvature of a cover plate located in the first sub-area is greater than zero in a direction parallel to a first edge. A first backplane of a supporting member is disposed on one side of a display function portion close to a binding portion. A second backplane is disposed on one side of the display function portion close to the binding portion. A distance between a first portion of the first backplane and the first edge is greater than a distance between a second portion of the first backplane and the first edge.

20 Claims, 15 Drawing Sheets

(58) Field of Classification Search
CPC .... G06F 1/1641; G06F 1/1626; G06F 1/1624; G06F 1/1681; G06F 1/16; G06F 1/203; G06F 2200/1612; G06F 1/1607; G06F 1/1618; G06F 1/182; G06F 1/1609; G06F 1/20; G06F 1/266; G06F 2203/04102; G06F 3/0412; H10K 2102/311; H10K 77/111; H10K 59/131; H10K 59/873; H10K 59/8794; H10K 2102/351; H10K 59/87; H10K 59/8722; H10K 2102/361; H10K 59/40; H10K 59/80; H10K 71/00; H10K 2101/80; H04M 1/0268; H04M 1/0216; H04M 1/0214; H04M 1/022; H04M 1/0247; H04M 1/0266; H04M 1/0269; H04M 1/0277; H04M 1/185; H04M 2250/16

See application file for complete search history.

(56) References Cited

U.S. PATENT DOCUMENTS

2023/0217603 A1* 7/2023 Zhu ............... G06F 1/1652
361/807

FOREIGN PATENT DOCUMENTS

WO WO-2022089036 A1 * 5/2022 ............ G09F 9/301
WO WO-2024011498 A1 * 1/2024 ......... H10K 59/8722

OTHER PUBLICATIONS

Written Opinion of the International Search Authority in International application No. PCT/CN2023/099541, mailed on Nov. 28, 2023.

* cited by examiner

DISPLAY MODULE

TECHNICAL FIELD

The present disclosure relates to the field of display, and in particular, to a display module.

BACKGROUND OF INVENTION

In some curved display modules, inventors of the present disclosure have found that a cover plate may include multi-directional bending at the same position, and the bending stress in the bending area of the display panel close to the lower frame is complicated. The bending stress includes the bending stress from the bending direction of the bending portion of the display panel itself and the bending stress applied to the bending portion from the bending direction of the cover plate. The two kinds of bending stresses increase the risk that the bending portion of the display panel generates a small-angle bending area and it shifts to one side of the cover plate, which easily leads to wiring breaking in the display panel, and appearance of abnormal display in the display module.

Therefore, there is an urgent need for a display module to solve the above technical problems.

SUMMARY OF INVENTION

The present disclosure provides a display module, which can solve the technical problem of abnormal shape of a bending portion of a display panel in a lower frame area of a current display module.

In order to solve the above problems, technical solutions provided by the present disclosure are as follows:

The present disclosure provides a display module including a central area and a first frame area disposed on one side of the central area, wherein the first frame area includes a first border area and a first corner area disposed on either side of the first border area, and the display module includes:
- a display panel including a display function portion disposed in the central area, a binding portion disposed opposite to the display function portion, and a bending portion connecting the display function portion and the binding portion;
- a cover plate disposed on a light-emitting side of the display panel, and the cover plate is disposed in the central area and the first frame area; and
- a supporting member disposed on one side of the display panel, the supporting member includes a first backplane and a second backplane that are oppositely disposed, the first backplane is disposed on one side of the display function portion close to the binding portion, and the second backplane is disposed on one side of the binding portion close to the display function portion;

wherein the display module includes a first edge corresponding to one side of the first frame area away from the central area, the first border area includes at least one first sub-area, a curvature of the cover plate located in the first sub-area is greater than zero in a direction parallel to the first edge, at least part of the bending portion is disposed in the first sub-area, the first backplane includes a first portion located in the first sub-area, the second backplane includes a second portion located in the first sub-area and corresponding to the first portion, and a distance between one side of the first portion close to the first edge and the first edge is greater than a distance between one side of the second portion close to the first edge and the first edge.

In some embodiments, the first border area further includes a second sub-area, and the first sub-area is disposed on either side of the second sub-area close to the first corner area; wherein the cover plate is disposed in a full curve, and a minimum curvature radius of the cover plate located in the second sub-area is larger than a maximum curvature radius of the cover plate located in the first sub-area.

In some embodiments, the second backplane further includes a third portion located in the second sub-area, and the third portion is connected to the second portion; the first backplane further includes a fourth portion located in the second sub-area, the fourth portion corresponds to the third portion, and a distance between the third portion and the first edge is equal to a distance between the fourth portion and the first edge; wherein curvature radiuses of the cover plate at any positions in the second sub-area are equal, and the curvature radius of the cover plate in the first sub-area gradually decreases in a direction from the second sub-area to the first corner area.

In some embodiments, the second backplane further includes a third portion disposed in the second sub-area and a fifth portion disposed in the first sub-area, the third portion is connected to the second portion through the fifth portion, and a distance between the fifth portion and the first edge is equal to a distance between the first portion and the first edge; the first backplane further includes a fourth portion located in the second sub-area, the fourth portion corresponds to the third portion, and a distance between the third portion and the first edge is equal to a distance between the fourth portion and the first edge; wherein curvature radiuses of the cover plate at any positions in the second sub-area are equal, and the curvature radius of the cover plate in the first sub-area gradually decreases in a direction from the second sub-area to the first corner area.

In some embodiments, in the first frame area, a curvature radius of the cover plate corresponding to the third portion remains unchanged, in a direction from the second sub-area to the first corner area, a curvature radius of the cover plate corresponding to the fifth portion gradually decreases and a curvature radius of the cover plate corresponding to the second portion gradually decreases.

In some embodiments, a minimum value of the curvature radius of the cover plate corresponding to the second portion is greater than a maximum value of the curvature radius of the cover plate corresponding to the fifth portion.

In some embodiments, the second backplane further includes a third portion located in the second sub-area, and a distance between the third portion and the first edge is greater than a distance between the second portion and the first edge.

In some embodiments, in a direction from a center of the second sub-area to the first corner area, the distance between the third portion and the first edge gradually decreases, and a curvature radius of the cover plate in the second sub-area gradually decreases.

In some embodiments, the third portion includes a first sub-portion and a second sub-portion disposed on both sides of the first sub-portion, the first sub-portion is connected to the second portion through the second sub-portion, in the direction from a center of the second sub-area to the first corner area, a distance between the first sub-portion and the first edge remains unchanged, a distance between the second sub-portion and the first edge gradually decreases, and a curvature radius of the cover plate in the second sub-area gradually decreases.

In some embodiments, a distance between one side of the second portion close to the first edge and the first edge gradually decreases in a direction from the second sub-area to the first corner area.

In some embodiments, the side of the second portion close to the first edge is an arc surface.

In some embodiments, the side of the second portion close to the first edge is an arc surface concave to the central area of the display module.

In some embodiments, the side of the second portion close to the first edge is a plane, and an included angle between the side of the second portion close to the first edge and the side of the first portion close to the first edge is greater than 0 degree.

In some embodiments, an elastic modulus of the second portion is greater than an elastic modulus of the first portion.

In some embodiments, an elastic modulus of the second backplane is greater than an elastic modulus of the first backplane.

In some embodiments, the elastic modulus of the first backplane ranges from 1 GPa to 3 GPa, and the elastic modulus of the second backplane ranges from 3 GPa to 5 GPa.

In some embodiments, a thickness of the second portion is greater than a thickness of the first portion.

In some embodiments, a thickness of the second backplane is greater than a thickness of the first backplane.

In some embodiments, the thickness of the first backplane ranges from 85 μm to 95 μm, and the thickness of the second backplane ranges from 100 μm to 150 μm.

In some embodiments, the display module further includes a connection layer disposed on a surface of one side of the second backplane close to the first backplane; and the connection layer includes a sixth portion located in the first sub-area, and a distance between one side of the sixth portion close to the first edge and the first edge is less than the distance between one side of the first portion close to the first edge and the first edge.

Advantageous Effects

According to the present disclosure, the second portion of the second backplane in the first border area extends in a direction farther away from the central area than the first portion of the first backplane corresponding to the second portion, so that the supporting performance of the second backplane to the bending portion of the display panel is improved, the arc angle of the bending portion tends to be circular, the abnormal shape of the bending portion close to the side of the cover plate is relieved, the stress uniformity on the bending portion is improved, the risk of wiring breaking in the display panel is reduced, and the display module is protected.

EMBODIMENTS OF INVENTION

Figure 1:
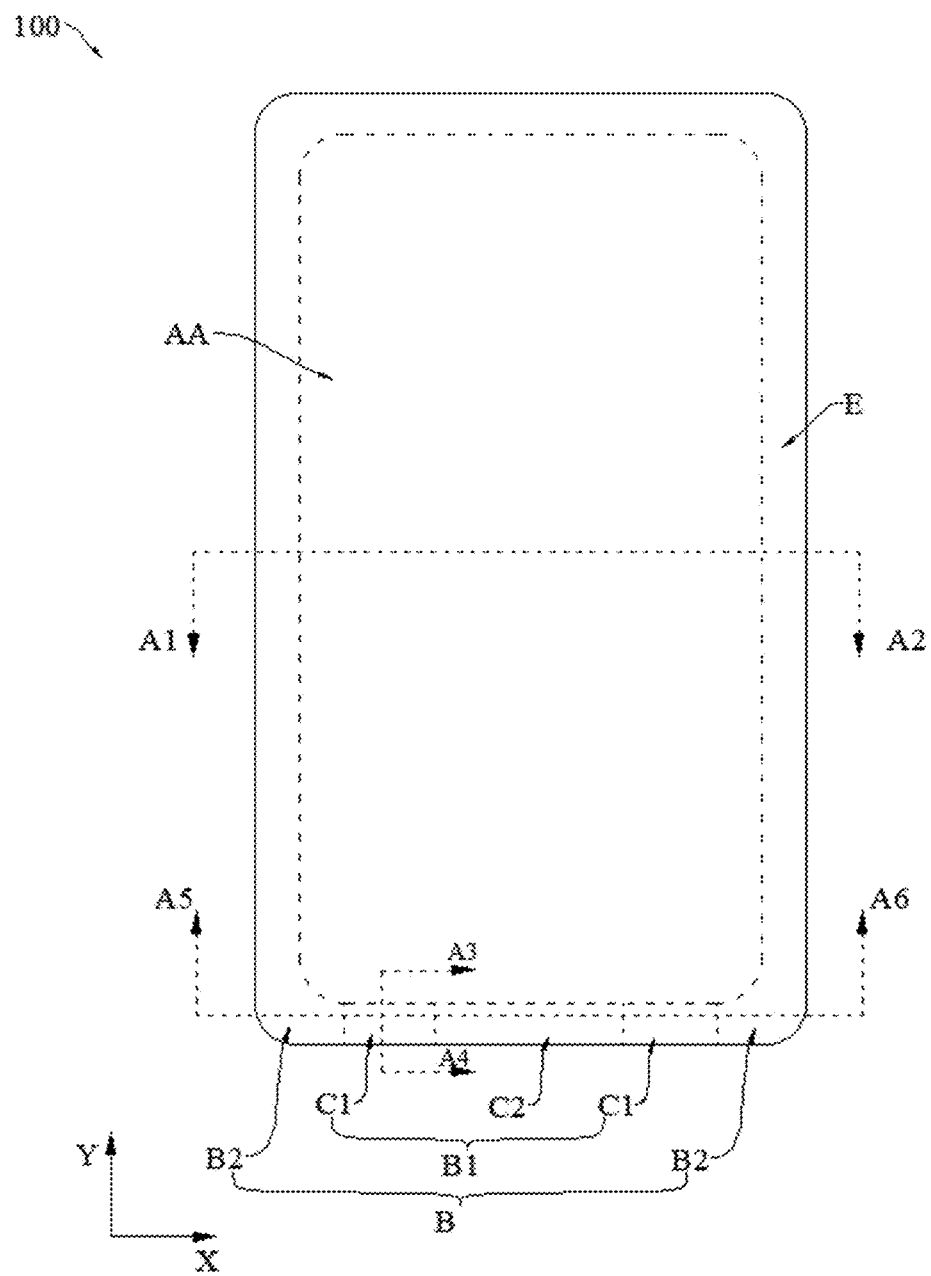
FIG. 1 is a schematic top view of a display module according to an embodiment of the present disclosure.

The present disclosure provides a display module. In order to make the purpose, technical solutions, and effects of the present disclosure clearer and more definite, hereinafter, the present disclosure will be will be further described in detail with reference to the accompanying drawings and embodiments. It should be understood that the specific embodiments described herein are only used to explain the present disclosure, and not to limit the present disclosure.

Since its naissance, display modules have been basically divided into two types according to the shape, namely, fixed-curve-shape display modules and folding display modules. A light-emitting side of the display panel is defined as a cover plate. With the development of the times, the appearance design of the display modules becomes more and more homogeneous. In order to improve the individuality design, the diversified design of the bending direction of the surface of the cover plate has emerged accordingly, which is sought after by consumers. However, due to the multi-directional bending design of the cover plate at the same position, the bending stress of the bending area of the display panel close to the lower frame is more complicated. The bending stress includes the bending stress from the bending direction of the bending portion of the display panel itself and the bending stress applied to the bending portion from the bending direction of the cover plate. The two kinds of bending stresses increase the risk that the bending portion of the display panel generates a small-angle bending area and it shifts to one side of the cover plate, which easily leads to wiring breaking in the display panel, and appearance of abnormal display in the display module.

Referring to FIGS. 1 to 18, an embodiment of the present disclosure provides a display module 100 including a central area AA and a first frame area B disposed on one side of the central area AA. The first frame area B includes a first border area B1 and two first corner areas B2 disposed on both sides of the first border area B1. The display module 100 includes:

A display panel 200, which includes a display function portion 210 disposed in the central area AA, a binding portion 230 disposed opposite to the display function part 210, and a bending portion 220 connecting the display function portion 210 and the binding portion 230.

A cover plate 300, which is disposed on a light-emitting side of the display panel 200. The cover plate 300 is disposed in the central area AA and the first frame area B.

A support member 400, which is disposed on one side of the display panel 200. The supporting member 400 includes a first backplane 500 and a second backplane 600 that are oppositely disposed. The first backplane 500 is disposed on one side of the display function portion 210 close to the binding portion 230. The second backplane 600 is disposed on one side of the binding portion 230 close to the display function portion 210.

The display module 100 includes a first edge 110 corresponding to one side of the first frame area B away from the central area AA. The first border area B1 includes at least two first sub-areas C1, and a curvature of the cover plate 300 located in the first sub-area C1 is greater than zero in a direction parallel to the first edge 110. At least part of the bending portion 220 is disposed in the first sub-area C1. The first backplane 500 at least includes a first portion 510 located in the first sub-area C1. The second backplane 600 at least includes a second portion 610 located in the first sub-area C1 and corresponding to the first portion 510. A distance between one side of the first portion 510 close to the first edge 110 and the first edge 110 is greater than a distance between one side of the second portion 610 close to the first edge 110 and the first edge 110.

According to the present disclosure, the second portion of the second backplane in the first sub-area C1 extends in a direction farther away from the central area than the first portion of the first backplane corresponding to the second portion, so that the supporting performance of the second backplane to the bending portion of the display panel is improved, the arc angle of the bending portion tends to be circular, the abnormal shape of the bending portion close to the side of the cover plate is relieved, the stress uniformity of the bending portion is improved, the risk of wiring breaking in the display panel is reduced, and the display module is protected.

The technical solutions of the present disclosure will now be described in connection with specific embodiments.

In this embodiment, referring to FIG. 1, FIG. 3, FIG. 8, and FIG. 9, the display module 100 includes a central area AA and a first frame area B 1 disposed on one side of the central area AA. The first frame area B includes a first border area B1 and at least two first corner areas B2 disposed on both sides of the first border area B1. The first border area B1 includes a second sub-area C2 and at least two first sub-areas C1 disposed on one side of the second sub-area C2 close to the first corner area B2. The display module 100 includes a display panel 200, a cover plate 300 disposed on the light-emitting side of the display panel 200, and a supporting member 400 disposed on one side of the display panel 200. The display panel 200 includes a display function portion 210 disposed in the central area AA, a binding portion 230 disposed opposite to the display function portion 210, and a bending portion 220 connecting the display function portion 210 and the binding portion 220. The bending portion 220 is disposed in the first frame area B. The cover plate 300 is disposed in the central area AA and the first frame area B.

Figure 3:
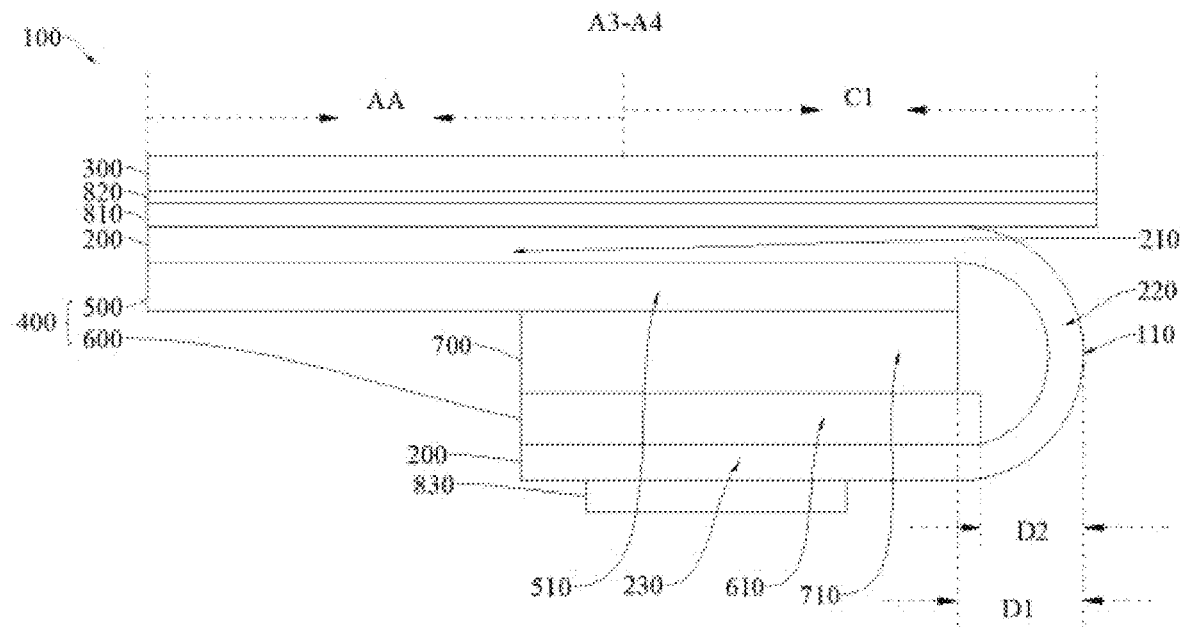
FIG. 3 is a schematic view of a first configuration of section A3-A4 in FIG. 1.

Referring to FIG. 3, the display module 100 includes a first edge 110 corresponding to the first frame area B. A curvature radius of the cover plate 300 located in the first sub-area C1 in a direction parallel to the first edge 110 is greater than zero, and a curvature radius of the cover plate 300 located in the first sub-area C1 in a direction perpendicular to the first edge 110 is greater than zero. That is, the cover plate 300 located in the first sub-area C1 applies a bending stress to the bending portion 220 in a direction parallel to the first edge 110, and a minimum curvature radius of the cover plate 300 located in the second sub-area C2 is greater than a maximum curvature radius of the cover plate 300 located in the first sub-area C1.

Figure 2:
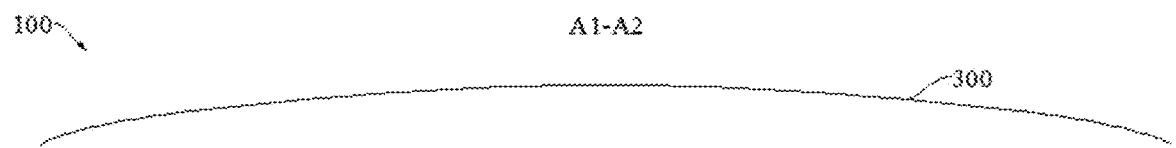
FIG. 2 is a schematic structural diagram of section A1-A2 in FIG. 1.

For the convenience of description, drawing and description are made by taking the cover plate 300 disposed in a full curve as an example. Referring to FIG. 2, which is a schematic diagram of the cover plate 300 in a full curve. The surface of the cover plate is not flat, and any part of the cover plate is designed in a curved arc. Please refer to the following for specific designs of the curvature radius of the cover plate.

Referring to FIG. 3, the support member 400 includes a first backplane 500 and a second backplane 600 that are oppositely disposed. The first backplane 500 is disposed on one side of the display function portion 210 close to the binding portion 230. The second backplane 600 is disposed on one side of the binding portion 230 close to the display function portion 210.

Specifically, the display module may include four frame areas. Referring to FIG. 1 and FIG. 3, the first frame area B may be a lower frame area of the display module 100, and the first corner area B2 may be an area between the first frame area B and an adjacent frame area, wherein the adjacent frame area is shown by using the right frame area E as an example. The bending portion 220 is disposed in the first frame area B. The bending portion 220 is bent in the lower frame area, and the binding portion 230 is bent to the side of the display module 100 away from the light output.

Figure 5:
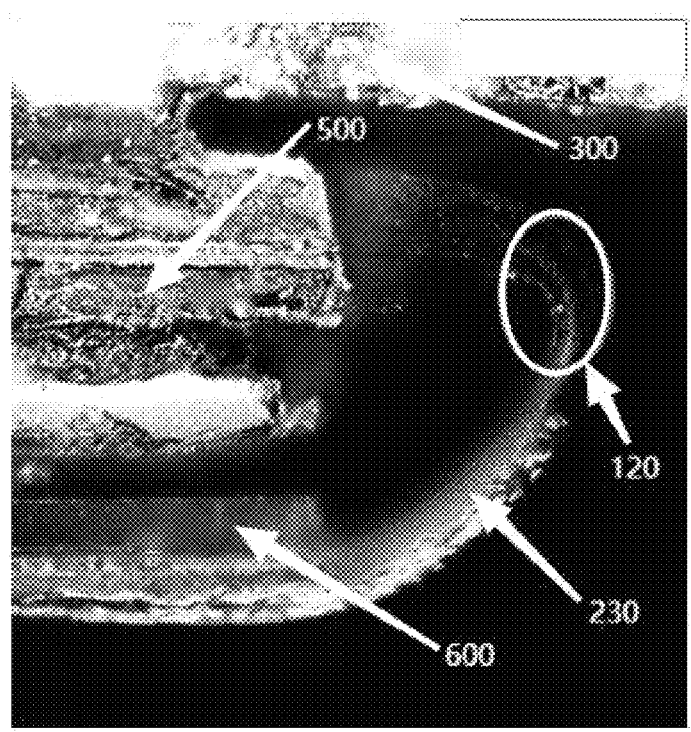
FIG. 5 is an electron micrograph picture of a lower frame area of a display module.

Since the curvature of the cover plate 300 located in the first sub-area C1 is greater than zero in the direction parallel to the first edge 110 (the curvature is greater than zero, i.e., the cover plate is non-planar), or referring to FIG. 5, since the cover plate is disposed in a full curve, the display panel 200 in the first sub-area C1 close to the first corner area B2 is subjected to a complex stress. For example, the bending stress includes the bending stress from the bending direction of the bending portion of the display panel itself and the bending stress applied to the bending portion from the bending direction of the cover plate. The bending stresses in two directions interacts with each other, which easily deform the bending portion 220 and cause the side of the bending portion 220 close to the cover plate 300 protrude towards the cover plate 300, resulting in the reduction of the arc angle of the bending portion 220 on the side close to the cover plate 300, resulting in a small-angle bending area 120. The stress on the wirings in the bending portion 220 increases, and the wirings are easy to break, which affects the effects of display.

Figure 6:
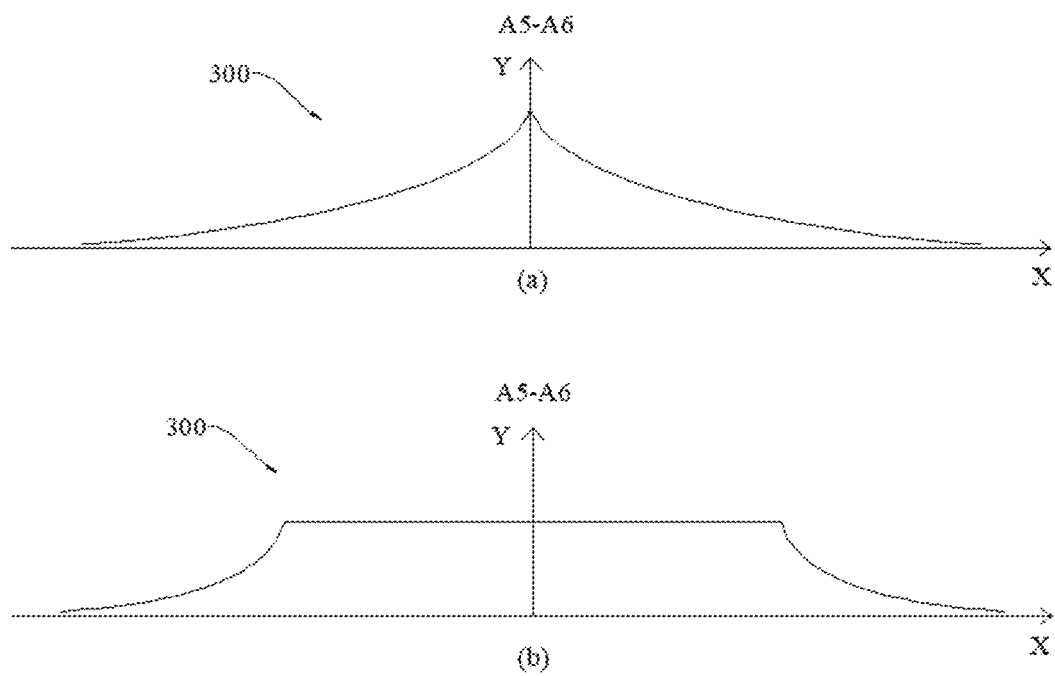
FIG. 6 is a schematic diagram of curved radians of the cover plate of FIG. 1 along section A5-A6.
Figure 7:
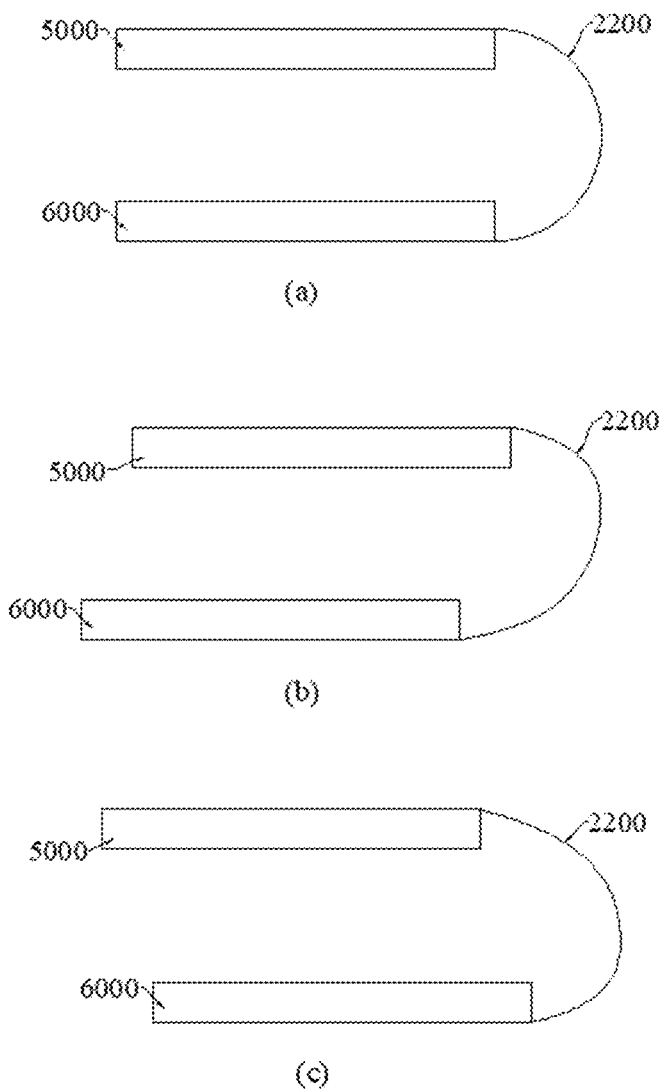
FIG. 7 is a schematic diagram of the positional relationship between a first backplane and a second backplane.

In the first frame area B, the curved curvature radius of the cover plate 300 is correlated with the setting position. In the first frame area B, the curvature radius of the cover plate 300 can be continuously reduced in the direction from the center of the second sub-area C2 to the first corner area B2, as shown in FIG. 6 (a). Alternatively, in the first frame area B, the curvature radius of the cover plate 300 can be kept constant at first and then gradually decreased in the direction from the center of the second sub-area C2 to the first corner area B2, as shown in FIG. 6 (b). The straight section in FIG. 6(b) indicates that the curvature radius of the cover plate 300 is constant, and the surface of the cover plate corresponding to this area is still an arc surface. Generally, the curvature radius of the cover plate close to the center of the second sub-area C2 is large, and even the surface of the cover plate may tend to be flat. In FIG. 6, the Y axis represents the curvature radius of the cover plate 300, the origin of the intersection of the X axis and the Y axis represents the center of the second sub-area C2, the positive direction of the X axis represents the direction from the center of the second sub-area C2 to the first corner area B2, and the negative direction of the X axis represents the direction from the center of the second sub-area C2 to another first corner area B2.

The cover plate 300 is disposed in a full curve, and a minimum curvature radius of the cover plate 300 located in the second sub-area C2 is larger than a maximum curvature radius of the cover plate 300 located in the first sub-areas C1. The curvature radius of the cover plate in the first sub-area C1 is small, and the bending portion 220 is more likely to generate a small-angle bending area with a small-angle bending. The cover plate at the junction point between the second sub-area C2 and the first sub-area C1 may belong to the cover plate in the second sub-area C2, and this limit position is explained herein for clarity.

Referring to FIG. 3, the display module 100 includes a first edge 110 corresponding to the first frame area B. The first backplane 500 includes a first portion 510 located in the first sub-area C1, and the second backplane 600 includes a second portion 610 located in the first sub-area C1, and a distance between one side of the first portion 510 close to the first edge 110 and the first edge 110 is greater than a distance between one side of the second portion 610 close to the first edge 110 and the first edge 110.

It can be understood that the first backplane 500 may include other portions located in the first sub-area C1 in addition to the first portion 510 located in the first sub-area C1, and the second backplane 600 may include other portions located in the first sub-area C1, in addition to the second portion 610 located in the first sub-area C1, this is explained herein for clarity.

Specifically, referring to FIG. 3, for convenience of understanding the display module, the first edge 110 may be the side of the bending portion 220 farthest from the central area. The distance between the first portion 510 and the first edge 110 is D1, and the distance between the second portion 610 and the first edge 110 is D2.

Alternatively, the first edge may also be the side of the cover plate away from the central area AA, which is taken as an example here, but is not specifically limited.

The principle that the second backplane in the first sub-area extends in a direction farther away from the central area than the first portion of the first backplane is beneficial to make the arc angle of the bending portion tends to be circular is explained as follows: For a non-full-curve display module, as shown in FIG. 7(a), the first backplane 5000 and the second backplane 6000 are flush with each other, so that the bending portion 2200 is in a semi-circular state, and the bending portion 2200 is subjected to an uniform stress. If the side of the first backplane 5000 close to the bending portion 2200 extends a farther distance towards the direction of the bending portion 2200 than the side of the second backplane 6000 close to the bending portion 2200, as shown in FIG. 7(b), the small-angle bending area of the bending portion 2200 is shifted towards the first backplane 5000, that is, the small-angle bending area of the bending portion 2200 is shifted towards the direction close to the cover plate. If the side of the second backplane 6000 close to the bending portion 2200 extends a farther distance towards the direction of the bending portion 2200 than the side of the first backplane 5000 close to the bending portion 2200, as shown in FIG. 7(c), the small-angle bending area of the bending portion 2200 is shifted towards the second backplane 6000, that is, the small-angle bending area of the bending portion 2200 is shifted towards the direction close to the cover plate.

Therefore, in the display module, as described above, before improvement, inventors of the present disclosure find that the bending portion of the display panel in the first sub-area is subjected to a complex stress, and a small-angle bending area of the bending portion is easy to appear, and it will shift towards the side close to the cover plate. After improvement by the technical solutions of the present disclosure, as shown in FIG. 3, D1 is greater than D2, and the side of the second portion 610 away from the central area AA is closer to the first edge 110 than the side of the first portion 510 away from the central area AA. That is, the side of the second portion 610 away from the central area AA extends a farther distance towards the direction of the bending portion than the side of the first portion 510 away from the central area AA. At least a part of the bending portion 220 is located in the first sub-area C1, for example, at least a part of the end surface of the bending portion 220 close to the first corner area B2 is located in the first sub-area C1, so that the second portion 610 has a better supporting effect on the bending portion 220 of the display panel 200, which is beneficial to pull the small-angle bending area of the bending portion 220 to the side away from the cover plate 300, thereby helping to make the arc angle of the bending portion 220 tend to be circular, so that the abnormal shape of the bending portion 220 close to the side of the cover plate 300 is relieved, the stress uniformity on the bending portion 220 is improved, the risk of wiring breakage in the display panel 200 is reduced, and the display module 100 is protected.

It should be noted that for a cover plate with general curvature (for example, a four-curved cover plate, the bending direction of the cover plate at the lower frame only involves the direction perpendicular to the lower frame) or a cover plate without curvature, in the process of manufacturing a display panel, the bending portion is not subjected to a bending stress from the cover plate in the direction parallel to the lower frame, and risk of generating a small-angle bending area in the bending portion is small, and the abnormal shape of the bending portion is not obvious, or it will not lead to abnormal shape of the bending portion. However, when the first backplane and the second backplane are not flush due to tolerance factors, the abnormal shape of the bending portion is not obvious, or it will not lead to abnormal shape of the bending portion. Therefore, for a cover plate with general curvature or a cover plate without curvature, there is no incentive for those skilled in the art to dispose the second backplane extending a farther distance than the first backplane in the direction towards the bending portion, as designed in the present disclosure, let alone to associate the extending amount of the second backplane relative to the first backplane with the curvature of the cover plate.

In some embodiments, the difference between D1 and D2 ranges from 50 µm to 150 µm, such as 50 µm, 75 µm, 95 µm, 100 µm, 110 µm, 125 µm, 140 µm, etc. Since it is necessary to take the manufacturing accuracy of each layer and the shift layers into account, it is better for the second portion 610 to extend a farther distance from the side away from the central area AA by 50 µm to 150 µm than the first portion 510.

Figure 8:
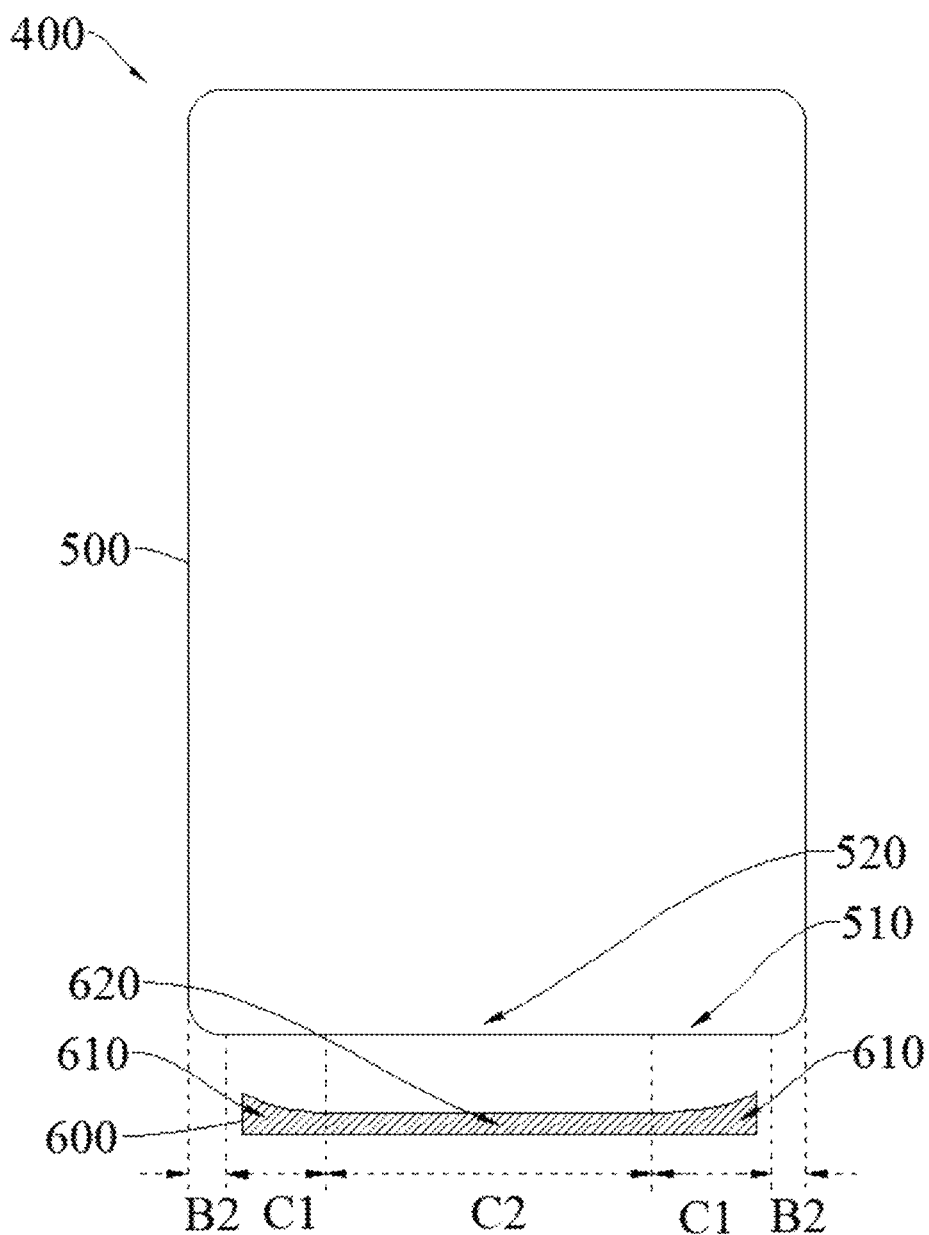
FIG. 8 is an unfolded schematic view of a support member of a display module in a first configuration according to an embodiment of the present disclosure.
Figure 9:
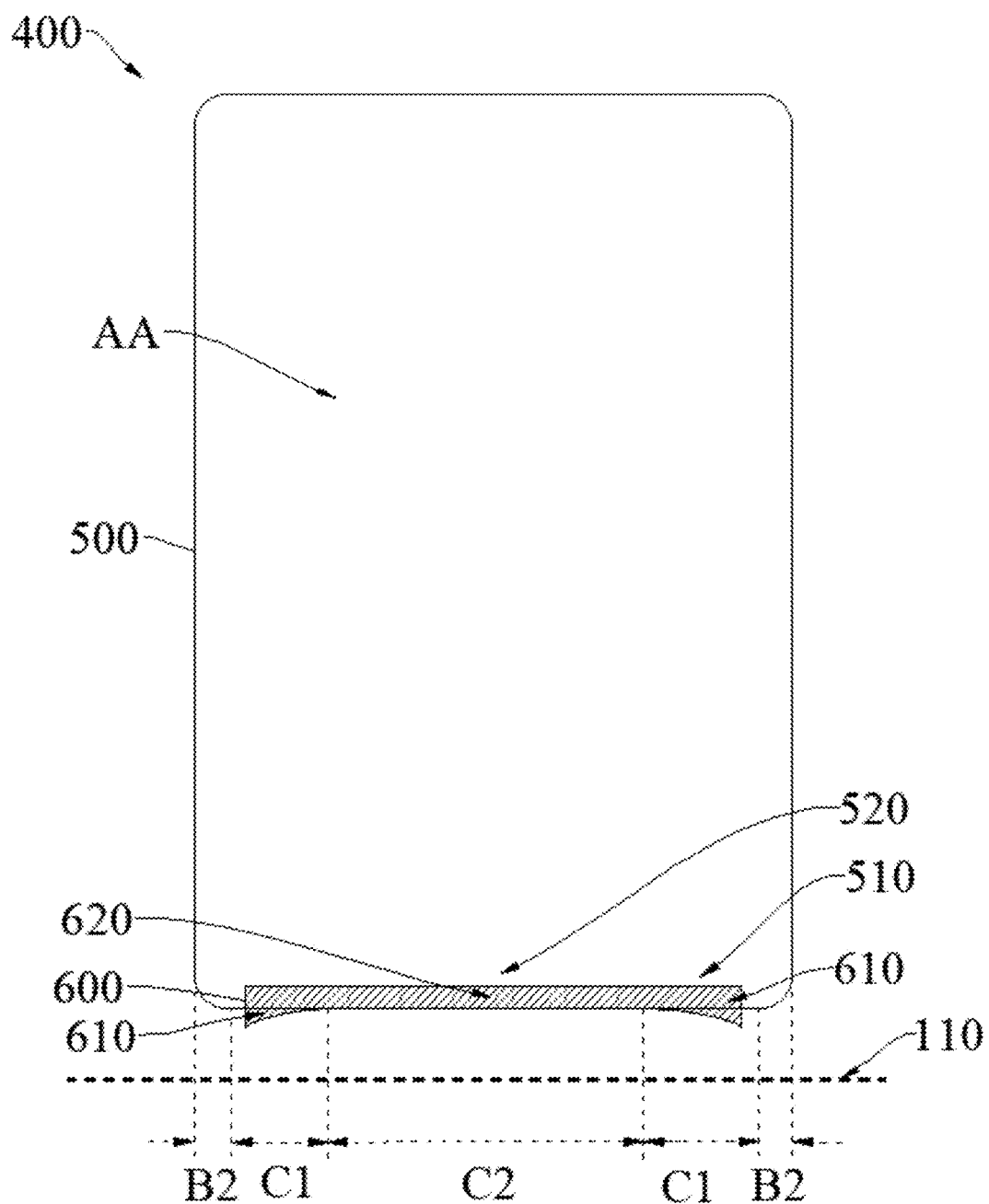
FIG. 9 is a schematic top view of a support member of a display module in a first configuration according to an embodiment of the present disclosure.

In some embodiments, referring to FIGS. 8 and 9, the second backplane 600 further includes a third portion 620 located in the second sub-area C2, and the third portion 620 is connected to the second portion 610. The first backplane 500 further includes a fourth portion 520 located in the second sub-area C2, the fourth portion 520 corresponds to the third portion 620, and a distance between the third portion 620 and the first edge 110 is equal to a distance between the fourth portion 520 and the first edge 110. Referring to the straight section in FIG. 6(b), the curvature radiuses of the cover plate 300 at any positions corresponding to the third portion 620 are equal, and curvature radiuses of the cover plate 300 at any positions in the second sub-area C2 are equal. Referring to the curve section in FIG. 6(b), in a direction from the second sub-area C2 to the first corner area B2, the curvature radius of the cover plate 300 in the first sub-area C1 gradually decreases, and the curvature radius of the cover plate 300 corresponding to the second portion 610 gradually decreases.

The fourth portion 520 corresponds to the third portion 620, which means that in the top view direction of the display module, an orthographic projection of the fourth portion 520 on the lower frame (i.e., the frame corresponding to the first frame area B) coincides with an orthographic projection of the third portion 620 on the lower frame (i.e., the frame corresponding to the first frame area B).

The intersection point between the straight section and the curve section in FIG. 6(b) is the inflection point of the curvature radius, the inflection point of the curvature radius in FIG. 6(b) corresponds to the junction of the second sub-area C2 and the first sub-area C1, and the inflection point of the curvature radius in FIG. 6(b) corresponds to the junction of the second portion 610 and the third portion 620.

In the first frame area B, the curvature radius of the cover plate 300 in the second sub-area C2 remains unchanged, and the curvature radius of the cover plate 300 in the first sub-area C1 gradually decreases in a direction from the second sub-area C2 to the first corner area B2. That is, as the curvature radius of the cover plate 300 decreases, the side of the second backplane 600 away from the center area AA starts to extend a farther distance than the side of the first backplane 500 in the direction away from the center area AA. Specifically, the extending amount of the second backplane 600 can be adjusted following the decrease in the curvature radius of the cover plate 300, so as to alleviate the abnormal shape of the bending portion 220 close to the cover plate 300, improve the stress uniformity on the bending portion 220, reduce the risk of wiring breakage in the display panel 200, and protect the display module 100.

Figure 17:
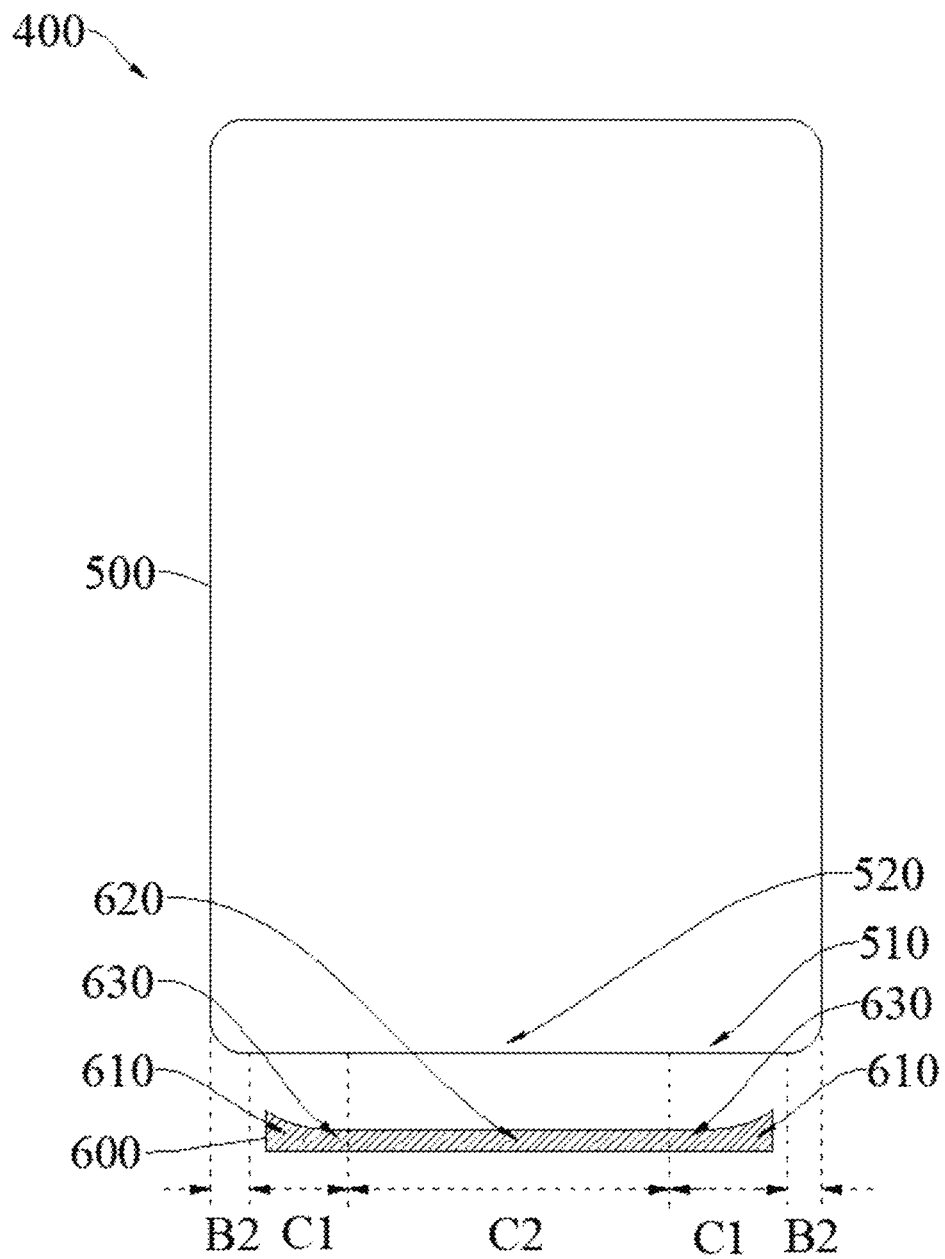
FIG. 17 is an unfolded schematic view of a support member of a display module in a fifth configuration according to an embodiment of the present disclosure.
Figure 18:
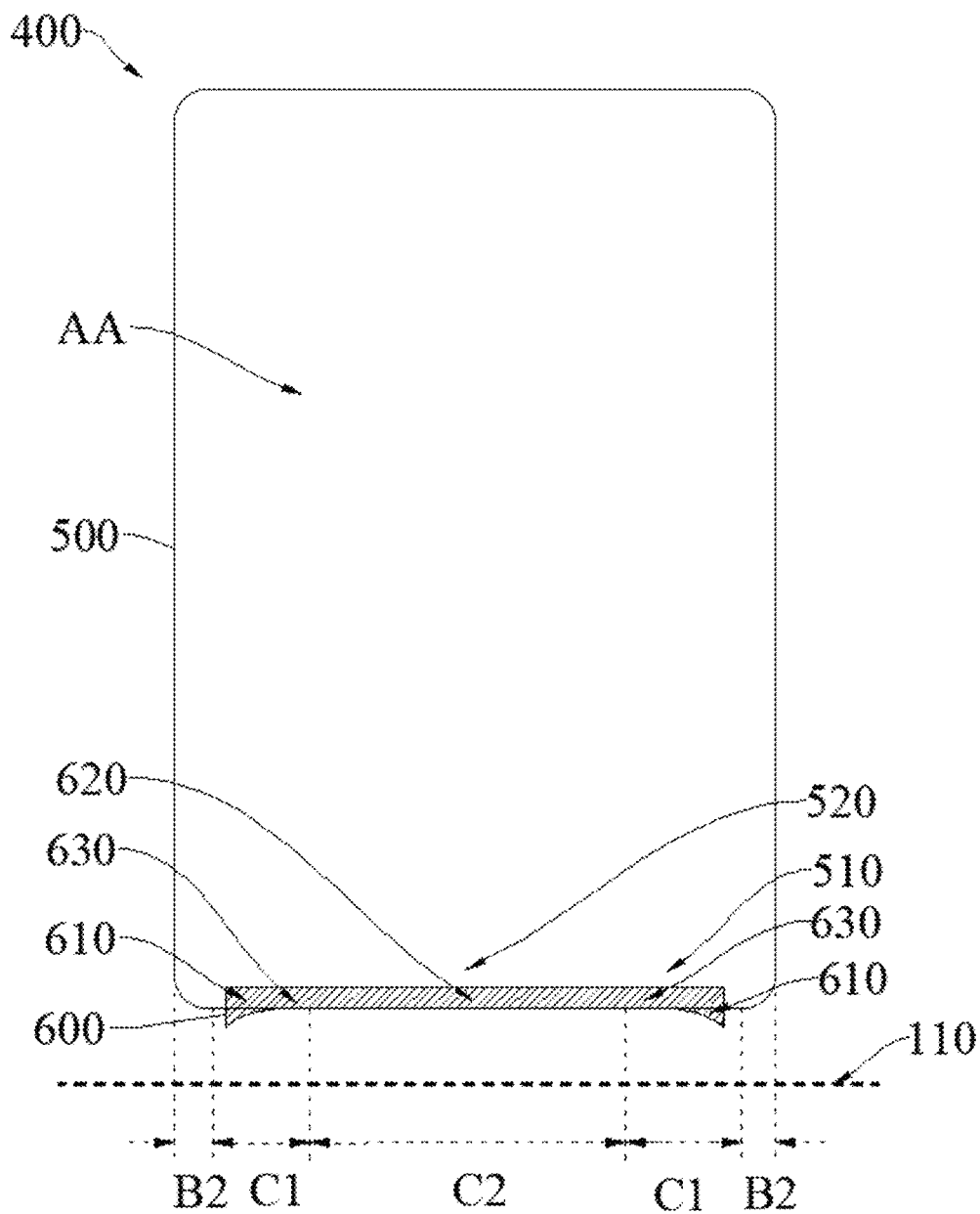
FIG. 18 is a schematic top view of a support member of a display module in a fifth configuration according to an embodiment of the present disclosure.

In some embodiments, referring to FIGS. 17 and 18, the second backplane 600 further includes a third portion 620 located in the second sub-area C2 and a fifth portion 630 located within the first sub-area C1, the third portion 620 is connected to the second portion 610 through the fifth portion 630, and a distance between the fifth portion 630 and the first edge 110 is equal to a distance between the first portion 510 and the first edge 110. The first backplane 500 further includes a fourth portion 520 located in the second sub-area C2, the fourth portion 520 corresponds to the third portion 620, and a distance between the third portion 620 and the first edge 110 is equal to a distance between the fourth portion 520 and the first edge 110. The curvature radiuses of the cover plate 300 at any positions in the second sub-area C2 are equal, and the curvature radius of the cover plate 300 in the third portion 620 remains unchanged. In the direction from the second sub-area C2 to the first corner area B2, for example, please refer to the curve section in the positive direction of the X axis in FIG. 6(b), the curvature radius of the cover plate 300 in the first sub-area C1 gradually decreases, the curvature radius of the cover plate 300 corresponding to the fifth portion 630 decreases gradually, and the curvature radius of the cover plate 300 corresponding to the second portion 610 decreases gradually.

The inflection point of the curvature radius in FIG. 6(b) corresponds to the junction of the fifth portion 630 and the third portion 620.

In the first frame area B, the curvature radius of the cover plate 300 corresponding to the third portion 620 remains unchanged. In the direction from the second sub-area C2 to the first corner area B2, the curvature radius of the cover plate 300 corresponding to the fifth portion 630 gradually decreases, and the curvature radius of the cover plate 300 corresponding to the second portion 610 gradually decreases. The minimum value of the curvature radius of the cover plate 300 corresponding to the second portion 610 is larger than the maximum value of the curvature radius of the cover plate 300 corresponding to the fifth portion 630. That is, in the initial stage in which the curvature radius of the cover plate 300 decreases, the side of the second backplane 600 away from the center area AA does not extend a farther distance than the side of the first backplane 500 away from the center area AA in the direction away from the center area AA. This is because when the curvature radius of the cover plate 300 decreases, stress in each direction interacts with the bending portion 220, and the small-angle bending area of the bending portion 220 may not appear or change little. In this case, it is not necessary to extend the second backplane 600. In the area further away from the second sub-area C2, the second backplane 600 is extended. That is, the distance between the second portion 610 and the first edge 110 is smaller than the distance between the first portion 510 and the first edge 110, thereby reducing the influence on the normal arc area of the bent portion 220, reducing the risk of forming a small-angle bending area of the bending portion 220, improving the stress uniformity on the bending portion 220, reducing the risk of wiring breaking in the display panel 200, and protecting the display module 100.

Figure 13:
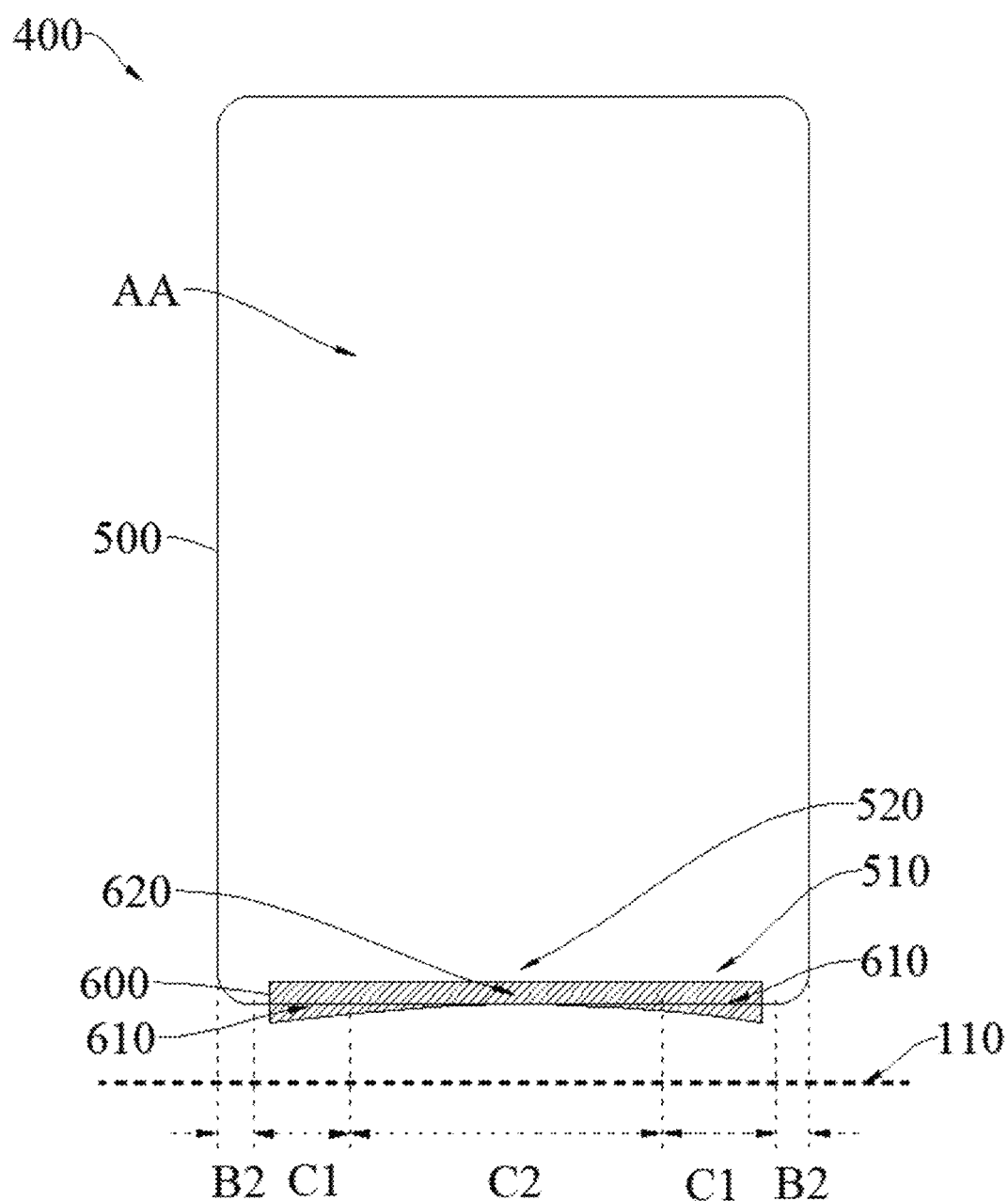
FIG. 13 is schematic top view of a support member of a display module in a third configuration according to an embodiment of the present disclosure.

In some embodiments, referring to FIG. 13, the second backplane 600 further includes a third portion 620 located in the second sub-area C2, and a distance between the third portion 620 and the first edge 110 is greater than a distance between the second portion 610 and the first edge 110.

The present disclosure may focus on optimizing the second backplane 600 in the first sub-area C1, the second portion extends a farther distance than the third portion 620 in the direction away from the central area AA. As for the third portion 620, referring to FIG. 13, the third portion 620 of the second backplane 600 in the second sub-area C2 may extends a farther distance than the fourth portion 520 in the direction away from the central area AA.

Alternatively, referring to FIG. 9, the second backplane 600 in the second sub-area C2 may also remain flush with the first backplane 500, i.e., the third portion 620 is flush with the fourth portion 520.

Figure 12:
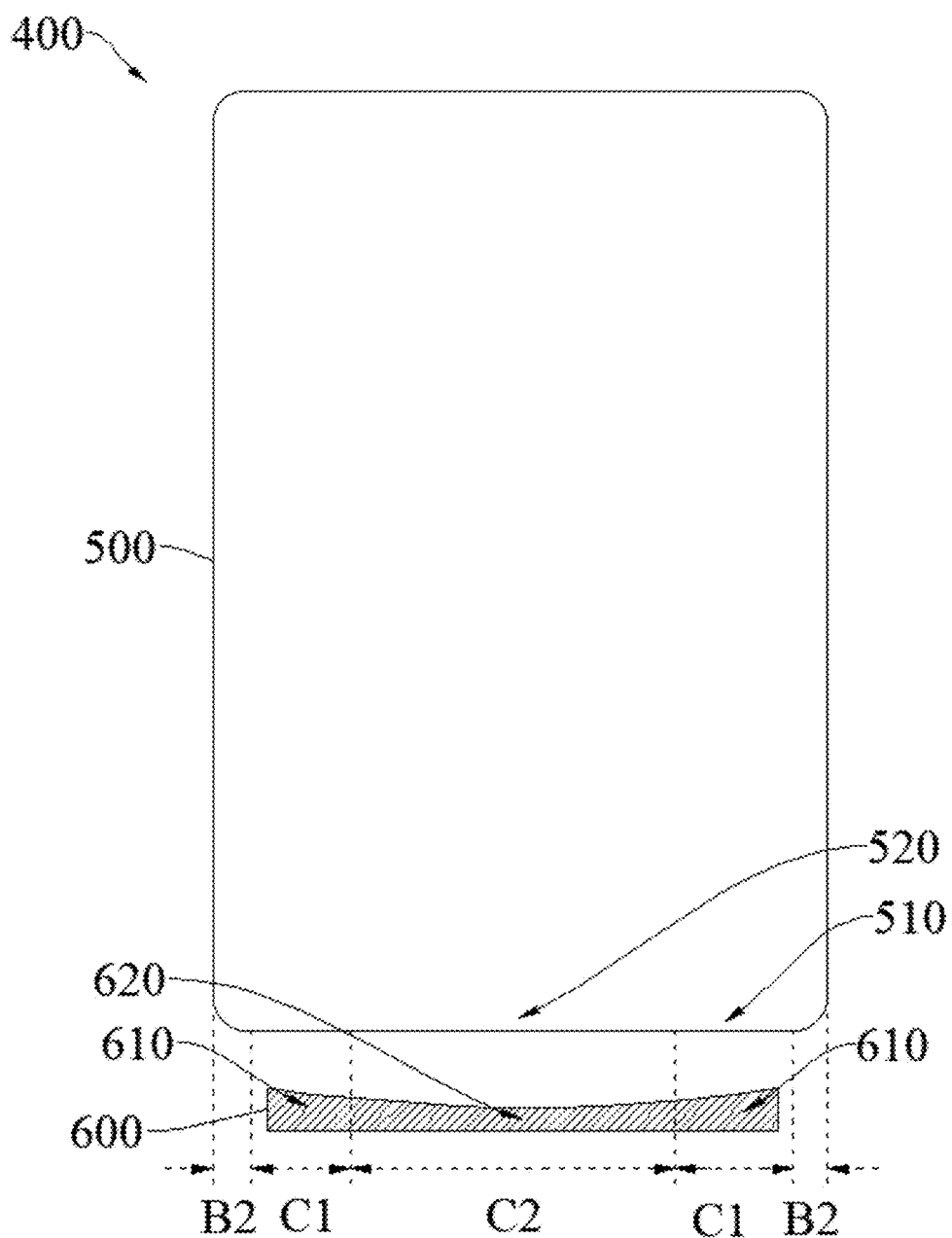
FIG. 12 is an unfolded schematic view of a support member of a display module in a third configuration according to an embodiment of the present disclosure.

In some embodiments, it can be specifically applied to any embodiment of the present disclosure. Referring to FIG. 13, the distance between the third portion 620 and the first edge 110 decreases gradually in the direction from the center of the second sub-area C2 to the first corner area B2. For example, with reference to the cover plate in FIG. 6(a), the curvature radius of the cover plate 300 in the second sub-area C2 gradually decreases in the direction from the center of the second sub-area C2 to the first corner area B2. Referring to FIG. 12, the second backplane 600 of the first border area B1 is optimized as a whole in the process of manufacture, so that the bending portion 220 in the first border area B1 is better supported, thus relieving the abnormal shape of the bending portion 220 close to the cover plate 300, improving the stress uniformity on the bending portion 220, reducing the risk of wiring breakage in the display panel 200, and protecting the display module 100.

Figure 16:
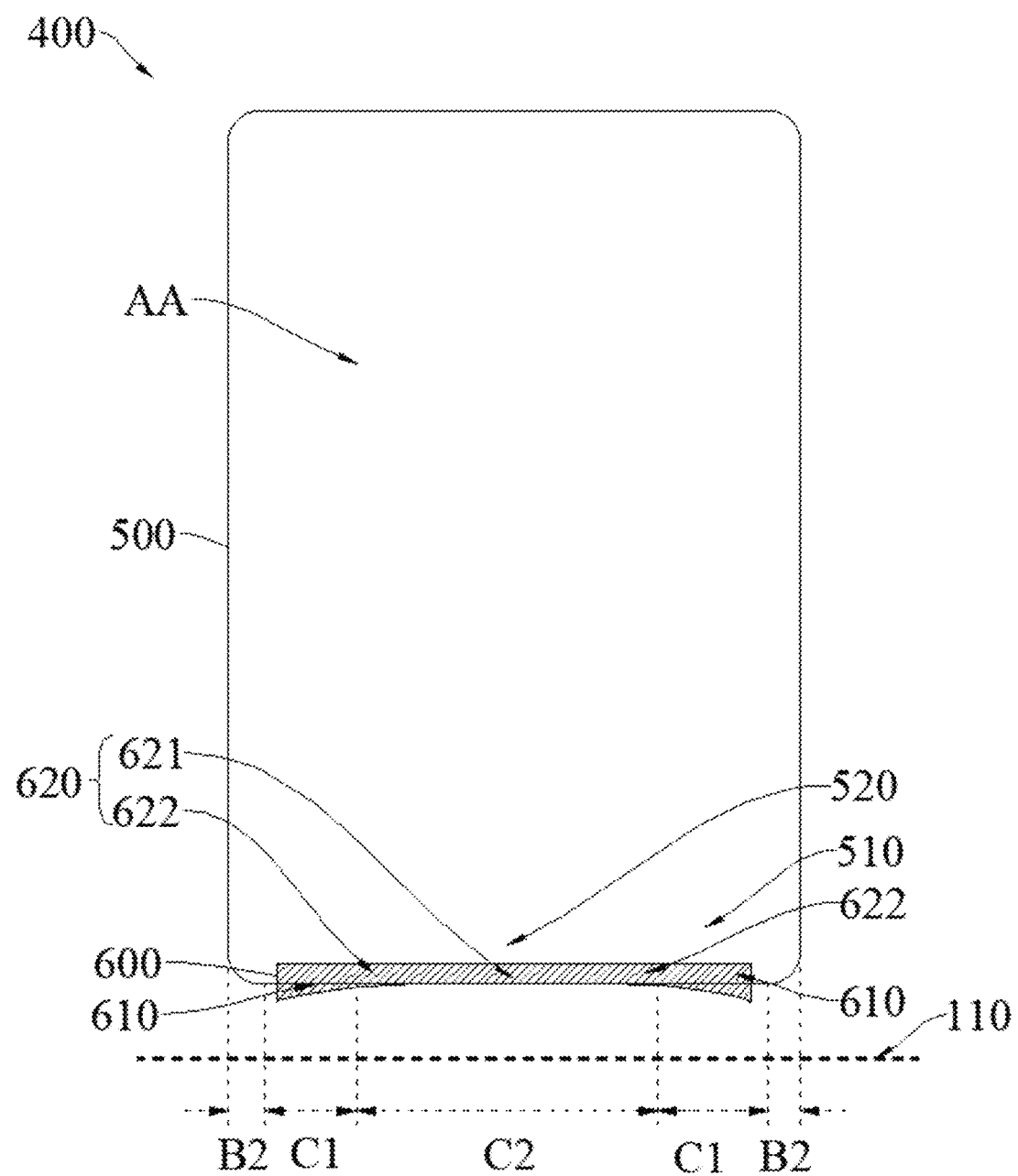
FIG. 16 is a schematic top view of a support member of a display module in a fourth configuration according to an embodiment of the present disclosure.

Alternatively, it can be specifically applied to any embodiment of the present disclosure. Referring to FIG. 16, the third portion 620 includes a first sub-portion 621 and at least two second sub-portions 622 disposed on both sides of the first sub-portion 621, and the first sub-portion 621 is connected to the second portion 610 through the second sub-portions 622. In the direction from the center of the second sub-area C2 to the first corner area B2, a distance between the first sub-portion 621 and the first edge 110 remains unchanged, and a distance between the second sub-portion 622 and the first edge 110 gradually decreases. For example, referring to the cover plate in FIG. 6(a), the curvature radius of the cover plate 300 in the second sub-area C2 decreases gradually in the direction from the center of the second sub-area C2 to the first corner area B2.

Figure 15:
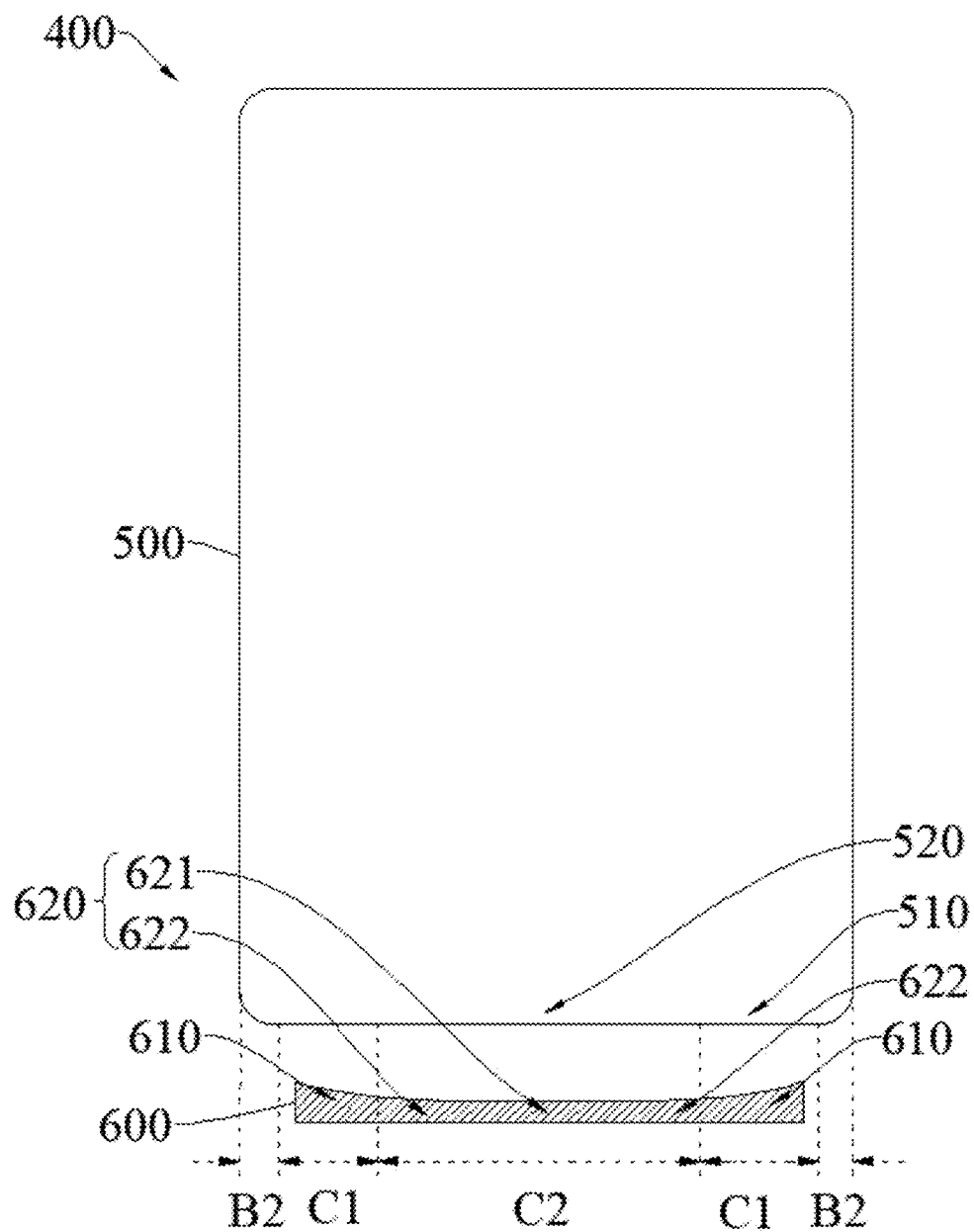
FIG. 15 is an unfolded schematic view of a support member of a display module in a fourth configuration according to an embodiment of the present disclosure.

Referring to FIG. 15, a part of the second backplane 600 in the first border area B1 is optimized in the process of manufacture. For example, combining with the cover plate in FIG. 6(a), the second backplane 600 close to the center of the second sub-area C2 is kept flush with the first backplane 500, and the extending amount of the second backplane 600 in the second sub-area C2 is gradually reduced in a direction towards the side away from the center area AA relative to the first backplane 500 in the second sub-area C2, so that the risk of small-angle bending area of the bending portion 220 shifting towards the second backplane 600 is reduced. Referring to FIG. 16, the second backplane 600 (i.e., the second sub-portion 622) close to the first sub-area C1 is provided to extend a farther distance than first backplane 500 in the first sub-area C1 in a direction towards the side away from the central area AA, so that the abnormal shape of the bending portion 220 close to the cover plate 300 is relieved, thus improving the stress uniformity on the bending portion 220, reducing the risk of wiring breakage in the display panel 200, and protecting the display module 100.

In some embodiments, referring to FIGS. 8-11, a distance between one side of the second portion 610 close to the first edge 110 and the first edge 110 gradually decreases in a direction from the second sub-area C2 to the first corner area B2.

For ease of understanding, please refer to the unfolded top view of a support member 400, for example FIG. 8, the unfolded top view is a state before the display panel is bent and bound. Referring to FIG. 9, in the direction from the second sub-area C2 to the first corner area B2, a distance between the second portion 610 and the first portion 510 is gradually reduced. In the direction from the second sub-area C2 to the first corner area B2, the distance between the second portion 610 and the first edge 110 is gradually reduced, the second portion 610 extends a farther distance than the first portion 510 in the direction towards the side away from the central area AA. The farther away from the second sub-area C2, the smaller the curvature radius of the cover plate 300 is, thus the greater the bending stress on the bending portion 220 of the display panel 200, and the easier it is to generate a small-angle bending area. The larger the extending amount of the second portion 610 than that of the first portion 510 in the direction towards the side away from the central area AA, it has better support for the bending portion 220 of the display panel 200, and it is more conducive to pull the small-angle bending area of the bending portion 220 towards the side away from the cover plate 300, thereby facilitating the arc angle of the bending portion 220 to be circular, alleviating the abnormal shape of the bending portion 220 towards the side away from the cover plate 300, improving the stress uniformity on the bending portion 220, reducing the risk of wiring breakage in the display panel 200, and protecting the display module 100.

Figure 10:
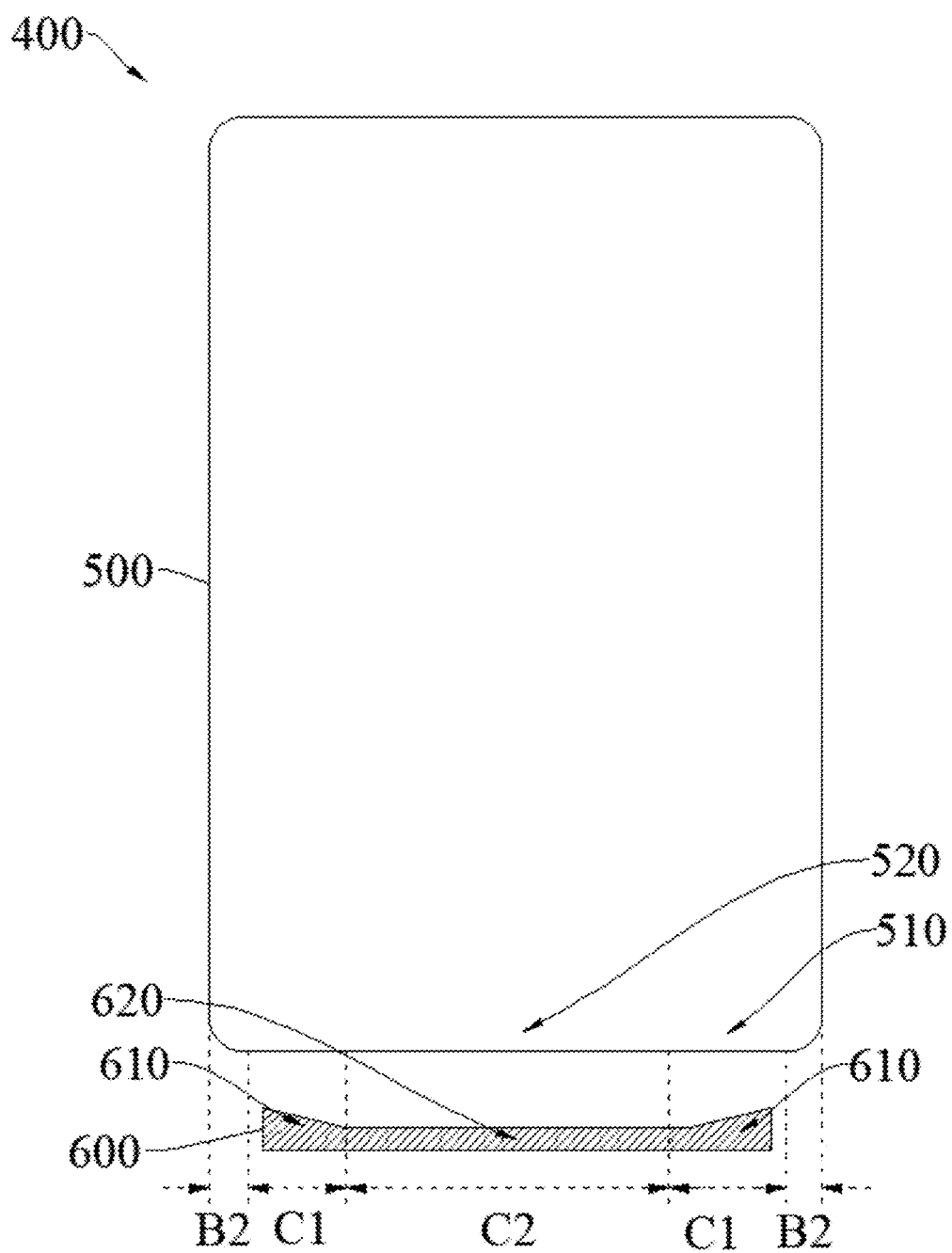
FIG. 10 is an unfolded schematic view of a support member of a display module in a second configuration according to an embodiment of the present disclosure.
Figure 11:
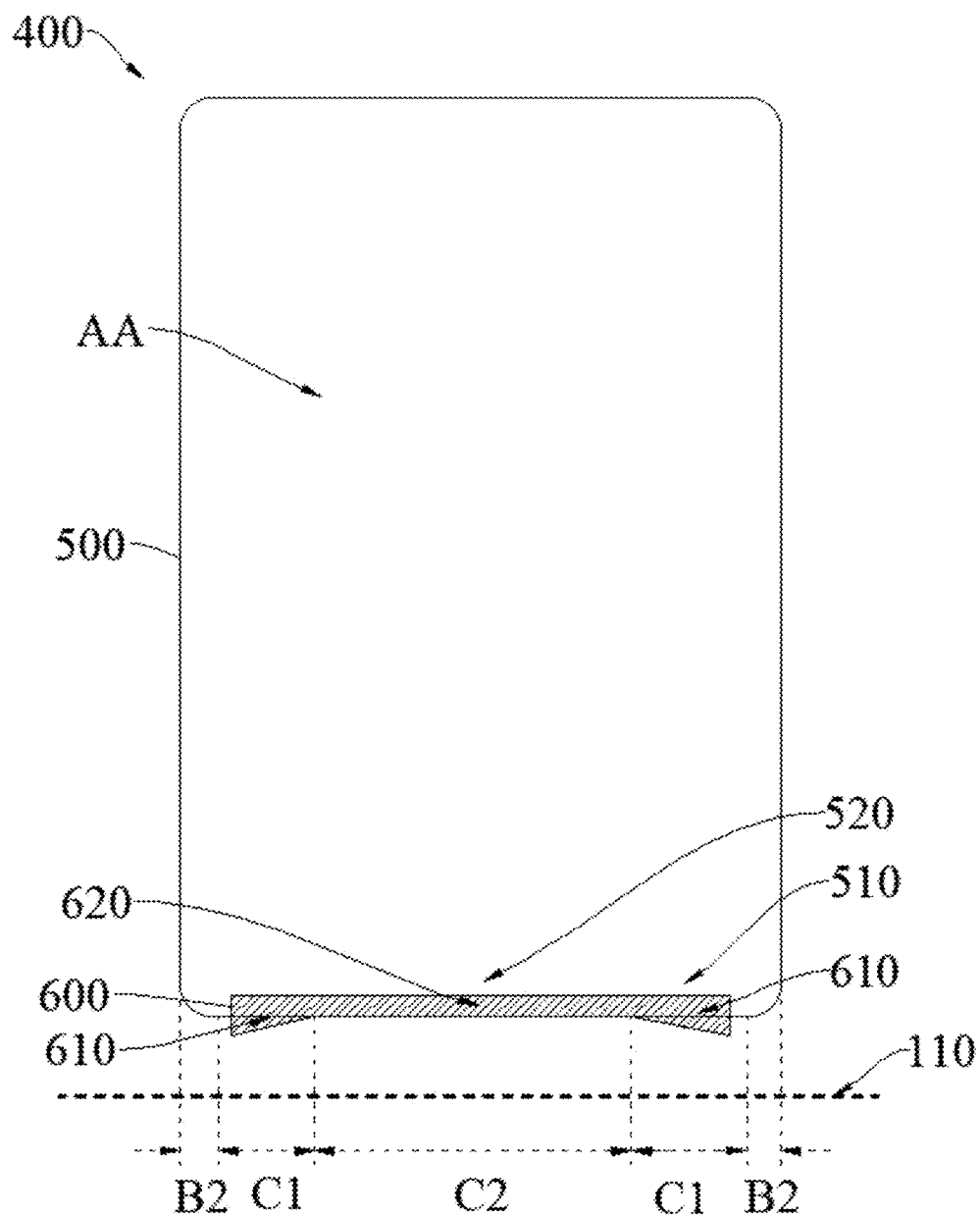
FIG. 11 is a schematic top view of a support member of a display module in a second configuration according to an embodiment of the present disclosure.

In some embodiments, referring to FIG. 11, the side of the second portion 610 close to the first edge 110 is a plane, and the included angle between the side of the second portion 610 close to the first edge 110 and the side of the first portion 510 close to the first edge 110 is greater than 0 degree. Referring to FIG. 10, the side of the second portion 610 close to the first edge 110 is a plane, which is convenient for production and accelerates production efficiency. At the same time, it is more conducive to making the arc angle of the bending portion 220 tend to be circular, alleviating the abnormal shape of the bending portion 220 close the cover plate 300, improving the stress uniformity on the bending portion 220, reducing the risk of wiring breakage in the display panel 200, and protecting the display module 100.

In some embodiments, referring to FIG. 9, the side of the second portion 610 close to the first edge 110 is an arc surface. Referring to FIG. 6, it can be seen that in an area close to both sides of the first frame area, for example, in the first sub-area C1 (not shown in FIG. 6, which may be a curve section close to both sides), the curvature radius of the cover plate 300 is a changing trend of the arc. The display panel 200 is attached to the cover plate 300, so that the bending portion 220 of the display panel 200 may exhibit a similar changing. Therefore, it is beneficial to match the changing trend of the bending portion 220 of the display panel 200 by disposing the side surface of the second portion 610 close to the first edge 110 as an arc surface, which can better pull the small-angle bending area of the bending portion 220 to a side away from the cover plate 300, thereby the arc angle of the bending portion 220 to be circular, alleviating the abnormal shape of the bending portion 220 close to the cover plate 300, improving the stress uniformity on the bending portion 220, reducing the risk of wiring breakage in the display panel 200, and protecting the display module 100.

In some embodiments, referring to FIG. 9, the side of the second portion 610 close to the first edge 110 is an arc surface concave to the central area AA of the display module. Before the improvement, in the first sub-area, when the bending change angles are the same, the farther away from the second sub-area, the greater the change in the bending radius of the bending portion, the closer the small-angle bending area of the bending portion is to the side of the cover plate, the stronger the bending stress, and the greater the risk of damage to the bending portion 220. According to the technical solutions of the present disclosure, the side of the second portion 610 close to the first edge 110 is an arc surface concave to the central area of the display module 100, so that the increasing speed of the extending amount of the second portion 610 can be increased more and more rapidly, thereby facilitating matching of the tendency that the small-angle bending area of the bending portion 220 farther away from the second sub-area C2 is closer to the side of the cover plate 300, so as to better pull the small-angle bending area of the bending portion 220 to the side away from the cover plate 300, thereby facilitating the arc angle of the bending portion 220 to be circular, alleviating the abnormal shape of the bending portion 220 close to the cover plate 300, improving the stress uniformity on the bending portion 220, reducing the risk of wiring breakage in the display panel 200, and protecting the display module 100.

Referring to FIG. 16, in a direction parallel to the bottom of the first frame area B (including B2, C2 and C1), the ratio of the width of the first sub-portion 621 to the width of the second sub-portion 622 may be determined according to actual situations, and it can for example be 1:1, 1:2, 2:1, 1:3, 3:1, etc., which is not specifically limited herein.

In some embodiments, it can be specifically applied to any embodiment of the present disclosure. An elastic modulus of the second portion 610 is greater than an elastic modulus of the first portion 510. The larger the elastic modulus, the stronger the elasticity of the films, and thus having better the supporting performance. The second portion 610 has better supporting performance than the first portion 510, which reduces the risk of forming a small-angle bending area of the bending portion 220, improves the stress uniformity on the bending portion 220, reduces the risk of wiring breakage in the display panel 200, and protects the display module 100.

In some embodiments, it can be specifically applied to any embodiment of the present disclosure. An elastic modulus of the second backplane 600 is greater than an elastic modulus of the first backplane 500. In the manufacturing process, the second backplane 600 and the first backplane 500 are provided separately, so that the first backplane 500 and the second backplane 600 with different elastic moduli are easily formed, therefore, the manufacturing process is simple, the cost is low, and the practicability is high.

In some embodiments, it can be specifically applied to any embodiment of the present disclosure. The elastic modulus of the first backplane ranges from 1 GPa to 3 GPa, and elastic modulus of the second backplane 600 ranges from 3 GPa to 5 GPa. Specifically, the elastic modulus of the first backplane 500 may be 1 GPa, 1.5 GPa, 2 GPa, 2.5 GPa, 3 GPa, or the like. The elastic modulus of the second backplane 600 may be 3 GPa, 3.5 GPa, 4 GPa, 4.5 GPa, 5 GPa, or the like.

In some embodiments, it can be specifically applied to any embodiment of the present disclosure. The material of the first backplane 500 may be a copolymer olefin polymer (COP) and the material of the second backplane 600 may be polyethylene terephthalate (PET), which are taken as examples and not specifically limited herein.

Figure 4:
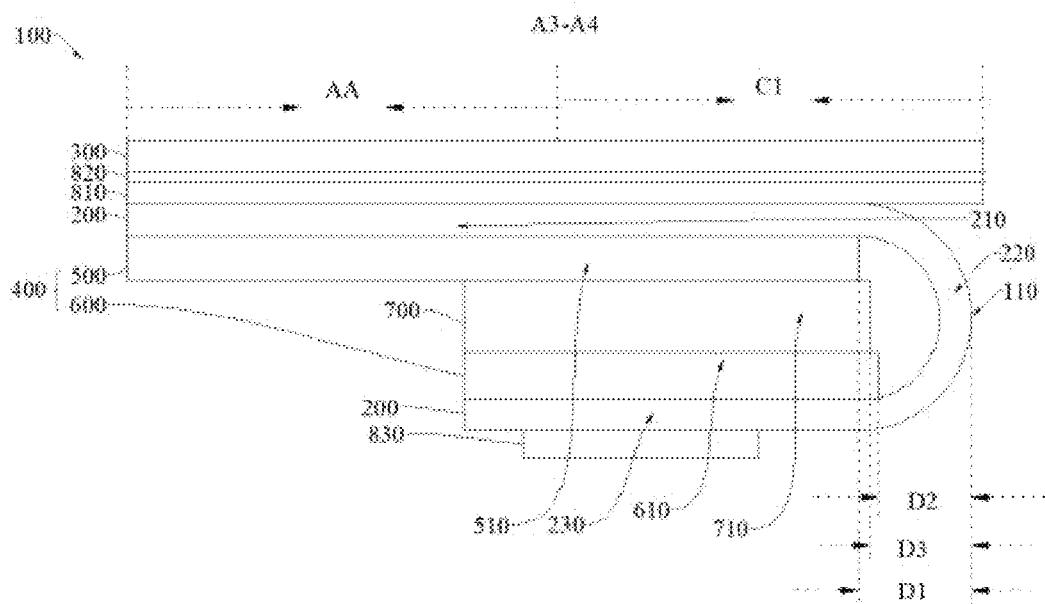
FIG. 4 is a schematic view of a second configuration of section A3-A4 in FIG. 1.

In some embodiments, it can be specifically applied to any embodiment of the present disclosure. Referring to FIGS. 3 and 4, the thickness of the second portion 610 is greater than the thickness of the first portion 510. The thicker the thickness, the stronger the supporting performance of the structure. The second portion 610 has better supporting performance than the first portion 510, which reduces the risk of forming a small-angle bending area of the bending portion 220, improves the stress uniformity on the bending portion 220, reduces the risk of wiring breakage in the display panel 200, and protects the display module 100.

In some embodiments, it can be specifically applied to any embodiment of the present disclosure. Referring to FIGS. 3 and 4, the thickness of the second backplane 600 is greater than that of the first backplane 500. In the manufacturing process, the second backplane 600 and the first backplane 500 are provided separately, so that the first backplane 500 and the second backplane 600 with different thicknesses are easily formed, therefore, the manufacturing process is simple, the cost is low, and the practicability is high.

In some embodiments, it can be specifically applied to any embodiment of the present disclosure. The thickness of the first backplane 500 ranges from 85 μm to 95 μm and the thickness of the second backplane 600 ranges from 100 μm to 150 μm. Specifically, the thickness of the first backplane 500 may be 85 μm, 88 μm, 90 μm, 93 μm, 95 μm, or the like. The thickness of the second backplane 600 may be 100 μm, 110 μm, 115 μm, 120 μm, 125 μm, 135 μm, or the like.

In some embodiments, it can be specifically applied to any embodiment of the present disclosure. Referring to FIG. 4, the display module 100 further includes a connection layer 700 disposed on a surface of one side of the second backplane 600 close to the first backplane 500. The connection layer 700 includes a sixth portion 710 located in the first sub-area C1. A distance between the sixth portion 710 and the first edge 110 is less than the distance between the first portion 510 and the first edge 110.

Figure 14:
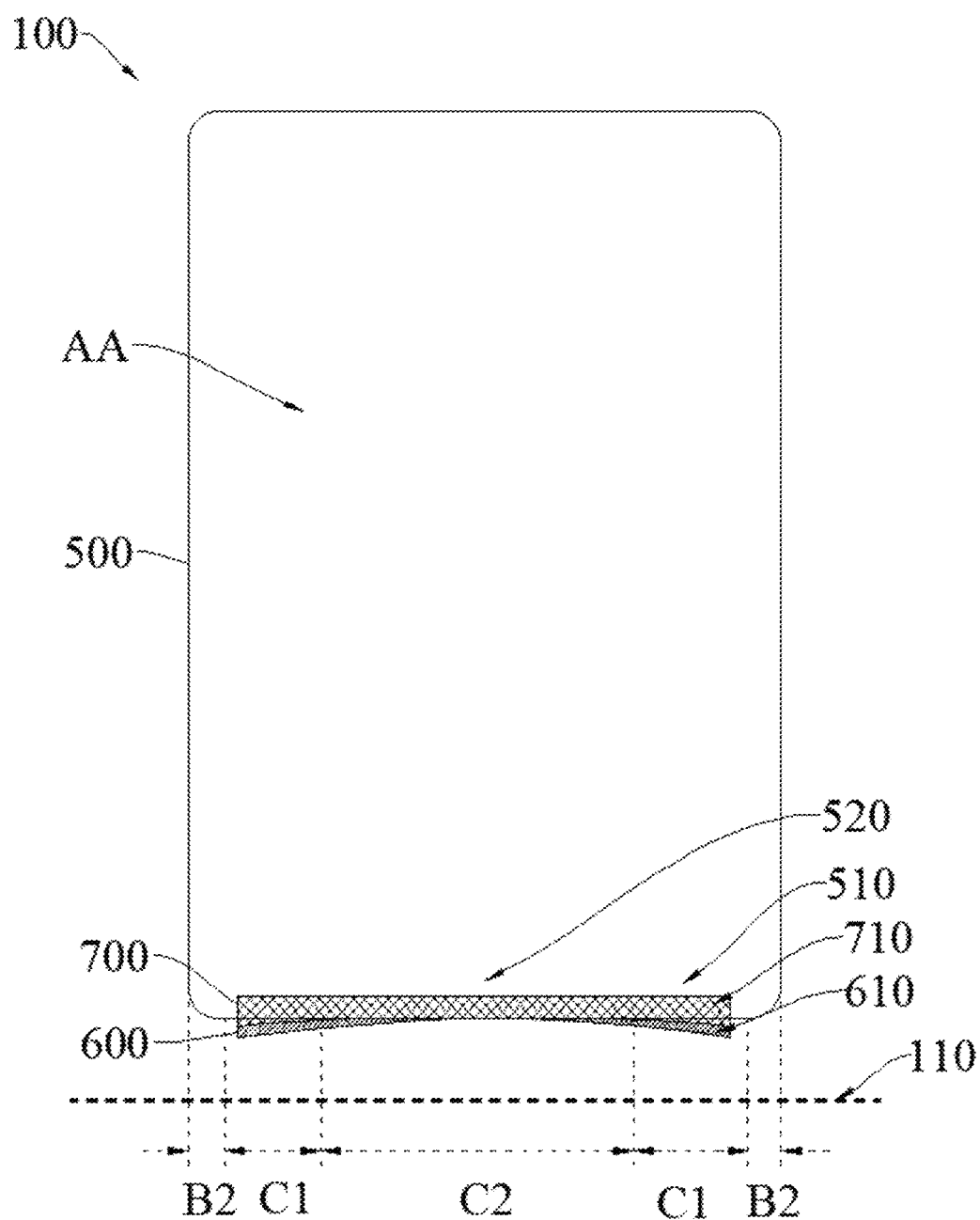
FIG. 14 is schematic partial top view of a display module according to an embodiment of the present disclosure.

Referring to FIG. 14, it can be specifically applied to any embodiment of the present disclosure. The sixth portion 710 of the connection layer 700 extends farther a distance than the first portion 510 of the first backplane 500 in the direction towards the side away from the central area AA than. Referring to FIG. 4, the distance D3 between the side away from the central area AA of the sixth portion 710 and the first edge 110 is smaller than the distance D1 between the side of the first portion 510 from the central area AA and the first edge 110, that is, D3<D1, so as to provide the function of auxiliary support for the second portion 610. Therefore, support for the bending portion 220 can be strengthened, so as to reduce the risk of forming a small-angle bending area of the bending portion 220, improve the force uniformity on the bending portion 220, reduce the risk of wiring breakage in the display panel 200, and protect the display module 100.

In some embodiments, the elastic modulus of the connection layer 700 is greater than that of the second backplane 600, so as to better support the second backplane 600, thereby enhancing the support for the bending portion 220, and reducing the risk of forming a small-angle bending area of the bending portion 220.

In some embodiments, the connection layer 700 may be a multi-film structure in which materials with large elastic modulus and strong supportability are provided to increase the elasticity, and the specific materials may be selected from materials with different elastic modulus according to actual situations, which is not specifically limited herein.

In some embodiments, referring to FIGS. 4 and 14, the distance between the sixth portion 710 and the first edge 110 is greater than the distance between the second portion 610 and the first edge 110.

Referring to FIG. 4, the distance D3 between the side of the sixth portion 710 away from the central area AA and the first edge 110 is greater than the distance D2 between the side of the second portion 610 away from the central area AA, that is, D3>D2. As the main support structure, the amount of the second portion 610 extending a farther distance than the first portion 510 in the direction towards the central area AA is greater than the amount of the sixth portion 710 extending a farther distance than the first portion 510 in the direction towards the central area AA, thus ensuring the support performance of the second portion 610, avoiding excessive amount of the sixth portion 710 extending than the first portion 510 in the direction towards the side away from the central area AA, and avoid excessive pressure on the bending portion 220 of the display panel 200, thereby protecting the display panel 200.

The comparison of any distance above is the comparison of the same position in the top view direction of the display module 100.

In some embodiments, referring to FIGS. 3 and 4, the display module 100 further includes a polarizing layer 810 between the display panel 200 and the cover plate 300, and an adhesive layer 820 between the polarizing layer and the cover plate 300.

In some embodiments, referring to FIGS. 3 and 4, the display module 100 further includes a driving unit 830 electrically connected to the binding portion 230.

In some embodiments, the display module may be a mobile phone module, which is only used as an example and is not specifically limited herein.

The first sub-area is closer to the first corner area than the second sub-area, the curvature radius of the cover plate in the first sub-area is smaller than the curvature radius of the cover plate in the second sub-area, and abnormal bending angles of the bending portion is more likely to generate in the first sub-area. In the present disclosure, the second backplane in the first sub-area extends in a direction farther away from the central area than the first backplane, so that the supporting performance of the second backplane to the bending portion of the display panel is improved, the arc angle of the bending portion tends to be circular, the abnormal shape of the bending portion close to the side of the cover plate is relieved, the stress uniformity on the bending portion is improved, thus reducing the risk of wiring breaking in the display panel, and protecting the display module.

Figure 19:
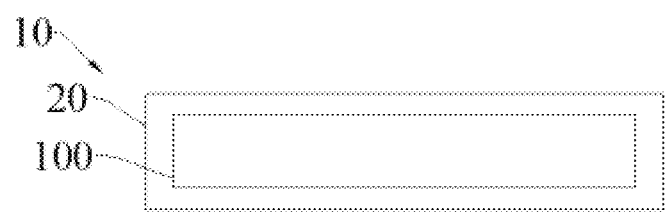
FIG. 19 is a schematic structural diagram of a display device according to an embodiment of the present disclosure.

Referring to FIG. 19, embodiments of the present disclosure further provide a display device 10 including the display module 100 as described above.

For the specific structure of the display module 100, please refer to any one of the above-described embodiments of the display module 100 and the accompanying drawings, and details are not described herein.

In the present embodiment, referring to FIG. 19, the display device 10 further includes a device main body 20 which is integrated with the display module 100.

In this embodiment, the device main body 20 may include a frame body, a frame adhesive, and the like. The display device 10 may be a mobile phone e, which is provided herein only an example and is not specifically limited.

Embodiments of the present disclosure disclose a display module. A first frame area of the display module includes a first border area and two first corner areas disposed on both sides of the first border area. The first border area includes at least two first sub-areas. The display module includes a cover plate, a display panel and a supporting member. The curvature of the cover plate located in the first sub-area is greater than zero in a direction parallel to the first edge. The supporting member includes a first backplane and a second backplane, wherein the first backplane is disposed on one side of the display function portion close to the binding portion, and the second backplane is disposed on one side of the binding portion close to the display function portion. The first backplane includes a first portion located in the first sub-area, the second backplane includes a second portion located in the first sub-areas and corresponding to the first portion, and a distance between the first portion and the first edge is greater than a distance between the second portion and the first edge. In the present disclosure, the second backplane extends a farther distance than the first backplane in a direction towards the first edge, so that the supporting performance of the second backplane to the bending portion is improved, and the bending portion tends to be circular, thereby relieving the abnormal shape of the bending portion.

It can be understood that a person with ordinary skill in the art can make equivalent substitutions or modifications according to the technical solutions and inventive concept of the present disclosure, and all these modifications or substitutions should fall within the protection scope of the claims attached to the present disclosure.

What is claimed is:

1. A display module comprising a central area and a first frame area disposed on one side of the central area, wherein the first frame area comprises a first border area and a first corner area disposed on either side of the first border area, and the display module comprises:
    a display panel comprising a display function portion disposed in the central area, a binding portion disposed opposite to the display function portion, and a bending portion connecting the display function portion and the binding portion;
    a cover plate disposed on a light-emitting side of the display panel, and the cover plate is disposed in the central area and the first frame area; and
    a supporting member disposed on one side of the display panel, the supporting member comprises a first backplane and a second backplane that are oppositely disposed, the first backplane is disposed on one side of the display function portion close to the binding portion, and the second backplane is disposed on one side of the binding portion close to the display function portion;
    wherein the display module comprises a first edge corresponding to one side of the first frame area away from the central area, the first border area comprises at least one first sub-area, a curvature of the cover plate located in the first sub-area is greater than zero in a direction parallel to the first edge, at least part of the bending portion is disposed in the first sub-area, the first backplane comprises a first portion located in the first sub-area, the second backplane comprises a second portion located in the first sub-area and corresponding to the first portion, and a distance between one side of the first portion close to the first edge and the first edge is greater than a distance between one side of the second portion close to the first edge and the first edge.

2. The display module according to claim 1, wherein the first border area further comprises a second sub-area, and the first sub-area is disposed on either side of the second sub-area close to the first corner area;
    wherein the cover plate is disposed in a full curve, and a minimum curvature radius of the cover plate located in the second sub-area is larger than a maximum curvature radius of the cover plate located in the first sub-area.

3. The display module according to claim 2, wherein the second backplane further comprises a third portion located in the second sub-area, and the third portion is connected to the second portion;
    the first backplane further comprises a fourth portion located in the second sub-area, the fourth portion corresponds to the third portion, and a distance between the third portion and the first edge is equal to a distance between the fourth portion and the first edge;

wherein curvature radiuses of the cover plate at any positions in the second sub-area are equal, and the curvature radius of the cover plate in the first sub-area gradually decreases in a direction from the second sub-area to the first corner area.

4. The display module of claim 2, wherein the second backplane further comprises a third portion disposed in the second sub-area and a fifth portion disposed in the first sub-area, the third portion is connected to the second portion through the fifth portion, and a distance between the fifth portion and the first edge is equal to a distance between the first portion and the first edge;

the first backplane further comprises a fourth portion located in the second sub-area, the fourth portion corresponds to the third portion, and a distance between the third portion and the first edge is equal to a distance between the fourth portion and the first edge;

wherein curvature radiuses of the cover plate at any positions in the second sub-area are equal, and the curvature radius of the cover plate in the first sub-area gradually decreases in a direction from the second sub-area to the first corner area.

5. The display module according to claim 4, wherein in the first frame area, a curvature radius of the cover plate corresponding to the third portion remains unchanged, in a direction from the second sub-area to the first corner area, a curvature radius of the cover plate corresponding to the fifth portion gradually decreases and a curvature radius of the cover plate corresponding to the second portion gradually decreases.

6. The display module according to claim 5, wherein a minimum value of the curvature radius of the cover plate corresponding to the second portion is greater than a maximum value of the curvature radius of the cover plate corresponding to the fifth portion.

7. The display module of claim 2, wherein the second backplane further comprises a third portion located in the second sub-area, and a distance between the third portion and the first edge is greater than a distance between the second portion and the first edge.

8. The display module according to claim 7, wherein in a direction from a center of the second sub-area to the first corner area, the distance between the third portion and the first edge gradually decreases, and a curvature radius of the cover plate in the second sub-area gradually decreases.

9. The display module according to claim 7, wherein the third portion comprises a first sub-portion and second sub-portions disposed on both sides of the first sub-portion, the first sub-portion is connected to the second portions through the second sub-portion, in the direction from a center of the second sub-area to the first corner area, a distance between the first sub-portion and the first edge remains unchanged, a distance between the second sub-portion and the first edge gradually decreases, and a curvature radius of the cover plate in the second sub-area gradually decreases.

10. The display module according to claim 2, wherein a distance between one side of the second portion close to the first edge and the first edge gradually decreases in a direction from the second sub-area to the first corner area.

11. The display module according to claim 10, wherein the side of the second portion close to the first edge is an arc surface.

12. The display module according to claim 11, wherein the side of the second portion close to the first edge is an arc surface concave to the central area of the display module.

13. The display module according to claim 10, wherein the side of the second portion close to the first edge is a plane, and an included angle between the side of the second portion close to the first edge and the side of the first portion close to the first edge is greater than 0 degree.

14. The display module of claim 1, wherein an elastic modulus of the second portion is greater than an elastic modulus of the first portion.

15. The display module of claim 14, wherein an elastic modulus of the second backplane is greater than an elastic modulus of the first backplane.

16. The display module according to claim 15, wherein the elastic modulus of the first backplane ranges from 1 GPa to 3 GPa, and the elastic modulus of the second backplane ranges from 3 GPa to 5 GPa.

17. The display module of claim 1, wherein a thickness of the second portion is greater than a thickness of the first portion.

18. The display module according to claim 17, wherein a thickness of the second backplane is greater than a thickness of the first backplane.

19. The display module according to claim 18, wherein the thickness of the first backplane ranges from 85 µm to 95 µm, and the thickness of the second backplane ranges from 100 µm to 150 µm.

20. The display module according to claim 1, wherein the display module further comprises a connection layer disposed on a surface of one side of the second backplane close to the first backplane; and the connection layer comprises a sixth portion located in the first sub-area, and a distance between one side of the sixth portion close to the first edge and the first edge is less than the distance between one side of the first portion close to the first edge and the first edge.

* * * * *